United States Patent [19]
Tuzuki et al.

[11] Patent Number: 5,415,603
[45] Date of Patent: May 16, 1995

[54] HYDRAULIC CONTROL SYSTEM FOR HYBRID VEHICLE

[75] Inventors: Shigeo Tuzuki; Miyoshi Kawaguchi, both of Aichi, Japan

[73] Assignee: Kabushikikaisha Equos Research, Japan

[21] Appl. No.: 37,044

[22] Filed: Mar. 25, 1993

[30] Foreign Application Priority Data

Apr. 1, 1992 [JP] Japan .................... 4-080063
Oct. 30, 1992 [JP] Japan .................... 4-315819

[51] Int. Cl.⁶ .................................... B60K 41/06
[52] U.S. Cl. .................................... 477/5; 477/138
[58] Field of Search ............... 477/2, 3, 5, 127, 130, 477/131, 138

[56] References Cited

U.S. PATENT DOCUMENTS

| | | | |
|---|---|---|---|
| 3,465,614 | 9/1969 | Reynolds | 477/130 |
| 3,592,083 | 7/1971 | Kawabata | 477/130 |
| 3,757,912 | 9/1973 | Ball, Jr. et al. | 477/5 |
| 4,416,360 | 11/1983 | Fiala | 477/5 |
| 4,533,011 | 8/1985 | Heidemeyer et al. | |
| 4,708,032 | 11/1987 | Harada et al. | 477/138 |
| 4,829,853 | 5/1989 | Sakaguchi | 477/127 |
| 5,010,991 | 4/1991 | Tsukamoto et al. | 192/3.3 |
| 5,127,485 | 7/1992 | Wakuta et al. | 180/65.5 |

FOREIGN PATENT DOCUMENTS 63901 4/1984 Japan .
104403 5/1987 Japan .

*Primary Examiner*—John T. Kwon
*Attorney, Agent, or Firm*—Lorusso & Loud

[57] ABSTRACT

A transmission in the hybrid vehicle taking the internal-combustion engine and the electric motor together. In the engine cruising mode, the clutch control valve 62 is adapted to feed the pressure oil in the hydraulic path A to the hydraulic servo C-1 and also feed the oil in the hydraulic path B to the torque converter 4. While, in the electric motor cruising mode, the inputclutch device 5 is disengaged and no oil is supplied to the converter 4 so that the oil drawn up from the oil sump 67 is almost fed to the electric motor.

10 Claims, 15 Drawing Sheets

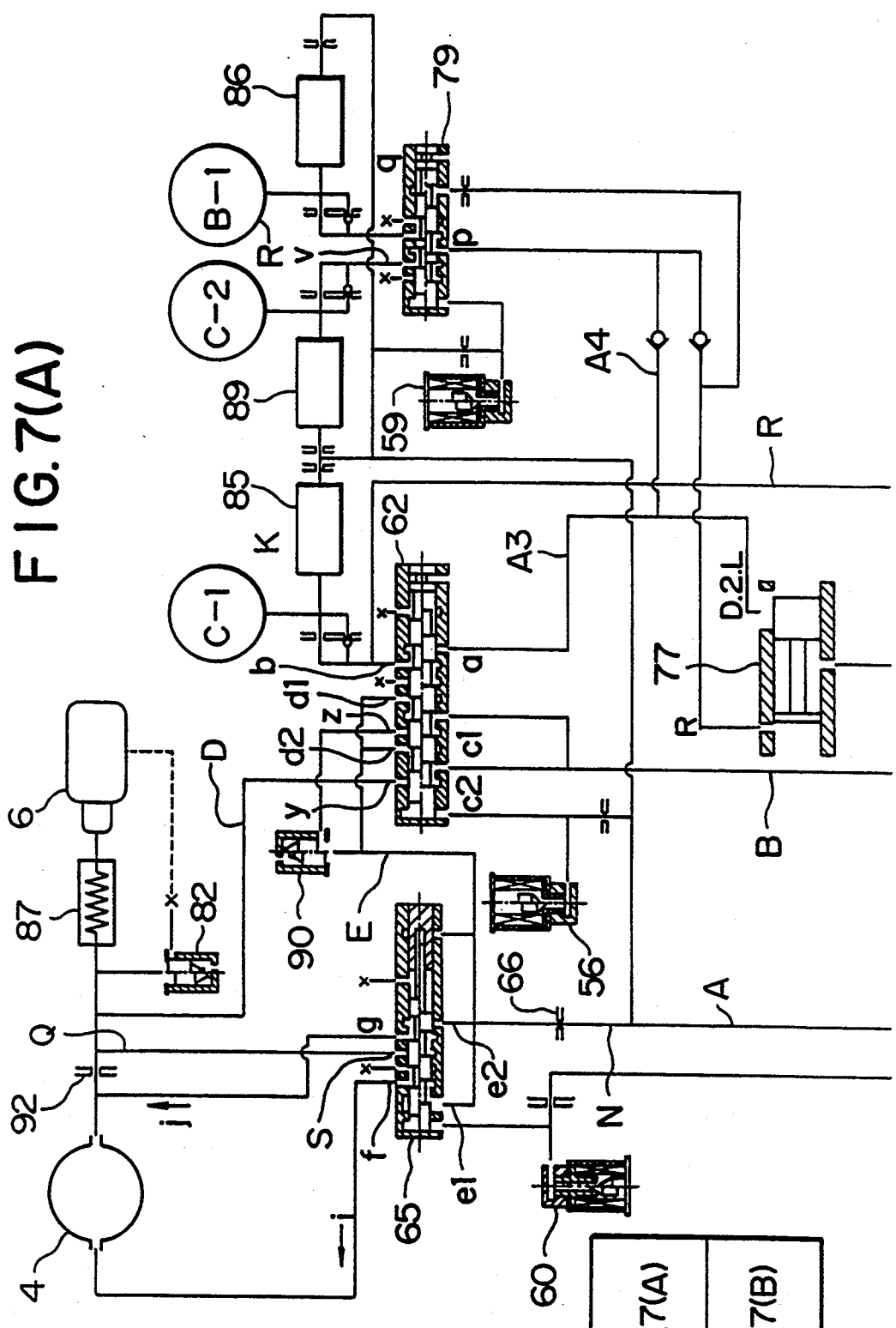

| FIG.7(A) |
| FIG.7(B) |

| FIG.8(A) | FIG.8(B) |

HYDRAULIC CONTROL SYSTEM FOR HYBRID VEHICLE

BACKGROUND OF THE INVENTION

1. Field of the Invention

This invention is broadly concerned with a so-called hybrid vehicle which has a combined power source consisting of an internal-combustion engine such as a gasoline or diesel engine and an electric motor driven by electrical energy stored in a battery, and intended particularly to be used to a hydraulic control system in the hybrid vehicle, which has a power transmitting mechanism employing a hydraulic power transmission such as a torque converter behind an output axle of the engine, and which can cool the electric motor as one of the power source of the vehicle, preferably.

2. Description of the Related Art

It is known that most of vehicles can be driven by the internal-combustion engine such as the gasoline or diesel engine in which fuel is burned. The internal-combustion engine is preferable to obtain high power to move the vehicle powerfully and to keep a long distance drive, but is inevitable to make a noise and produces exhaust gas like $No_x$, $Co_2$ and so on while running.

Reviewing such harm and protecting the environment, a new type vehicle using an electric motor with no noise and exhaust gas has been expected to be developed. However, a conventional electric vehicle have to mount therein a battery which is considerably heavy and of which electric capacity is limited, which is inferior to the internal-combustion engine in view of obtaining a drive power which is needed to accelerate, run under a overload state, and keep travelling at a high speed. A fatal problem in the electric vehicle is that it can not be used in various situations, since it does not enable a long cruising range on one battery charge.

It is noted that there has been invented a hybrid vehicle taking the internal-combustion engine and the electric motor together. There are two types of the hybrid vehicle in view of a combination of mentioned two power sources, one being a series-type (see, Japanese Patent Laid-open No. Sho 62-104403) wherein the vehicle is moved by a power from the electric motor which is constantly rotated by the internal-combustion engine, and the other being a parallel-type (see, Japanese Patent Laid-open No. Sho 59-63901 and U.S. Pat. No. 4,533,011) wherein the internal-combustion engine and the electric motor are parallel and selectively related with drive wheels of the vehicle.

A known cooling system for the electric motor used in the mentioned hybrid vehicles can be grouped into, for example, one of an air-cooled type, an oil-cooled type and a water-cooled type, or the other in view of a method of coolant circulation. But, the mentioned cooling system is provided only for the electric motor, which is not considered from a total point of view to effectively utilize an oil used in the power transmitting mechanism behind the engine. A plurality of axles, bearings, one-way clutches employed in the transmission do not need much oil to be lubricated for their smooth movements and cooling but have to have oil having a certain pressure. The electric motor does not need such a pressure oil but has to have much oil for its cooling.

However, as only minimum oil can be stored in a limited space, the above mentioned conventional hybrid vehicle could not control a preferable circulation of oil both for the transmission and the electric motor, so that the electric motor was not able to be used for a long term due to an insufficient oil and several axles, bearings, one-way clutches employed in the transmission were not lubricated enough due to low-pressure oil.

It is an object of the present invention to provide a hydraulic control system for the hybrid vehicle, wherein an oil used in the power transmitting mechanism behind the engine is appropriated both for cooling the electric motor with enough quantity of oil and for lubricating mechanical parts in the transmission with oil having a certain pressure.

SUMMARY OF THE INVENTION

The present invention is conceived based on the above mentioned recognitions. The invented hydraulic control system which takes an internal-combustion engine 1 and an electric motor 6 together and uses them 1, 6 selectively, a drive power of the internal-combustion engine 1 being finally transmitted to a differential gear unit 9 with drive axles 411, 41r through a hydraulic power transmission such as a torque converter 4 and an inputclutch device 5 and a drive power of the electric motor 6 being finally transmitted to the same. Such hydraulic system is characterized to have (1) a regulator valve 63 having at least two ports k and r, of which one port k is a line pressure port connecting with at least one hydraulic pump 19, 71 which draws up an oil and feed out the oil as a hydraulic oil and with a line pressure hydraulic path A and the other port r is a converter pressure port connecting with a converter pressure hydraulic path B, so that opening extent of the two ports k and r is variably controlled upon conditions; (2) a control valve 62 having at least two ports c and d in a state that the hydraulic oil transported in the converter pressure hydraulic path B is fed into the first port c and successively fed out from the second port d or in an opposite state that no hydraulic oil is fed into and out; (3) an oil path D for supply the oil to the electric motor 6 to cool a coil 30 of the electric motor; and (4) an electrical control unit ECU having a drive mode decision device 52 for determining a cruising mode of the vehicle, either an engine cruising mode in which the vehicle is moved by the engine 1 or an electric motor cruising mode in which the vehicle is moved by the electric motor 6, so that, in the engine cruising mode, the regulator valve 63 controls the pressure in the line pressure hydraulic path A and in the converter pressure hydraulic path B for the latter control valve 62 and the hydraulic power transmission 4 and, in the electric motor cruising mode, the regulator valve 63 regulates most of all the hydraulic oil from the at least one hydraulic pump 19, 71 to flow in the oil path D for the electric motor 6 and the control valve is operated that no hydraulic oil is fed into and out.

The control valve 62 in this hydraulic system should have the third port a connecting with the line pressure hydraulic path A and the fourth port connecting with a hydraulic servo C-1 for the inputclutch device 5, whereby, in the engine cruising mode, the inputclutch device 5 is in an engagement state by a serial opening of the third and the fourth ports a, b and, while in the electric motor cruising mode, the input-clutch device 5 is in a disengagement state.

And as will be noted with reference to FIGS. 7(A), 7(B) and 8(A), 8(B), the control valve 62 preferably has the fifth port, so that in the engine cruising mode the first and the second ports c1, d1 enable to flow the hydraulic oil therein and the fifth port y is shut to thereby forward the hydraulic oil to the hydraulic power transmission 4, and while in the electric motor cruising mode the first and the fifth ports c2, y enable to flow the hydraulic oil therein and the second port d is shut to thereby forward the hydraulic oil to the electric motor 6.

Yet, the hydraulic system according to the present invention is preferably provided with an orifice intervenes between the line pressure hydraulic path A or the converter pressure port B and an hydraulic path extending to the hydraulic power transmission 4.

Accordingly, in the engine cruising mode, the inputclutch device 5 is in an engagement state whereat a rotation of an output axle 1a of the engine 1 can be certainly transferred to the (front) drive axles 41l, 41r via the hydraulic power transmission 4 and the inputclutch device 5. The control valve 62 feeds the oil in the hydraulic path A to the hydraulic servo C-1 for the inputclutch device 5 and forwards the oil in the converter pressure hydraulic path B to the latter hydraulic power transmission 4.

While in the electric motor cruising mode, the inputclutch device 5 is disengaged and the electric motor 6 is operated to drive the axles 41l, 41r. In this mode, the pressure regulator valve 63 pass the oil through the ports k and r smoothly to thereby feed the oil drawn up the pump 19, 71 to the converter pressure hydraulic path B. The first and send ports c, d in the control valve 62 are shut not to forward the oil to the torque converter 4 and most of oil in the converter pressure hydraulic path B after the pressure regulator valve 63 is fed to the oil path D extending to the electric motor 6.

BRIEF DESCRIPTION OF THE DRAWINGS

FIG. 7(A), 7(B) is a hydraulic circuit in the third embodiment;

DETAILED DESCRIPTION OF THE PREFERRED EMBODIMENT(S)

Figure 1A:
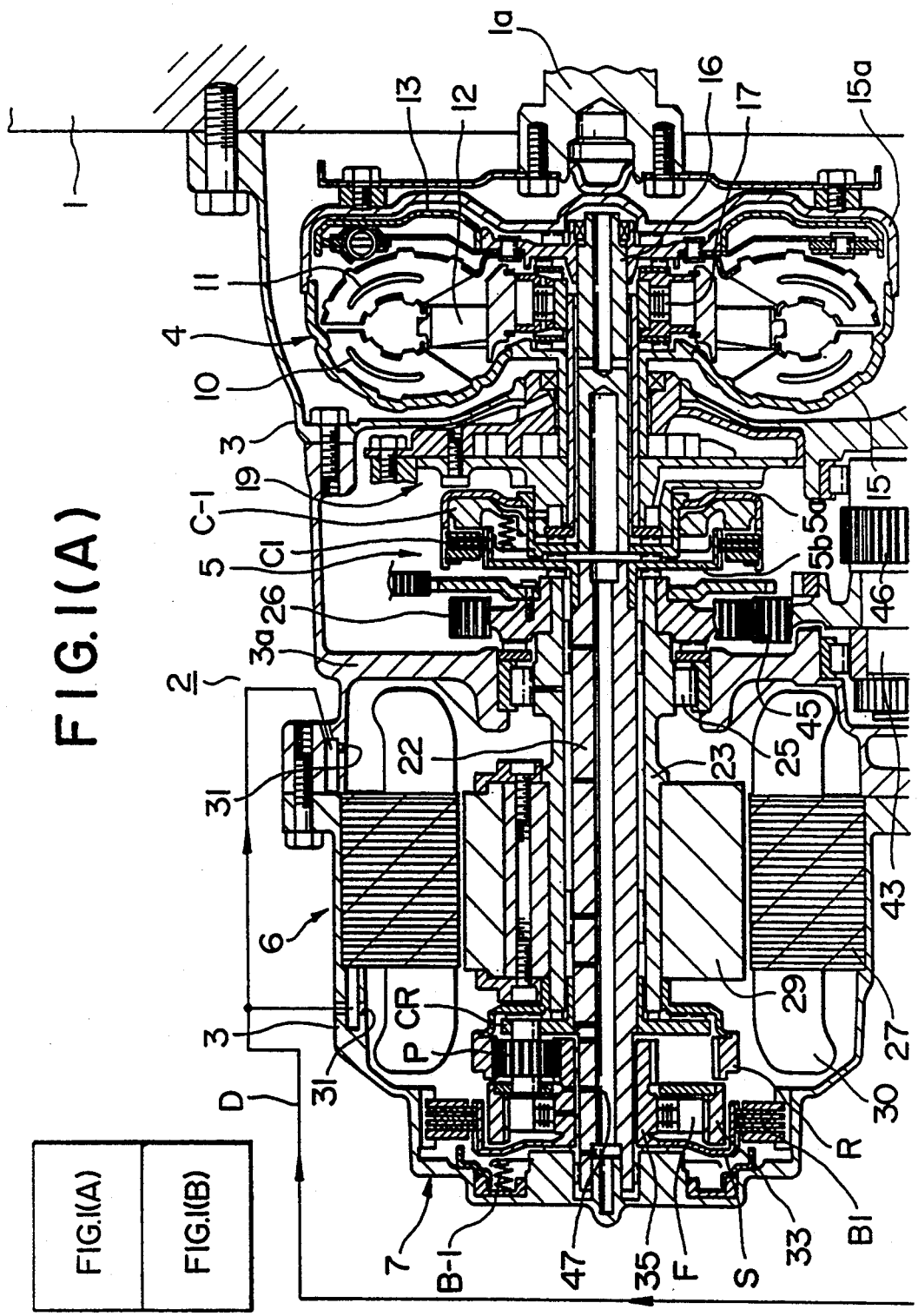
FIG. 1(A) and FIG. 1(B) are one sectional view indicating an overall composition of the transmission in a hybrid vehicle and additionally shows a diagrammatic view of the second embodiment of the hydraulic circuit according to the present invention.

The preferred embodiment of the present invention will now be described with reference to the attached drawings.

FIG. 1 shows a hybrid transmission 2 according to the present invention, which is disposed adjacent to an internal-combustion engine 1 such as a gasoline or diesel engine mounted sideways under a hood of a hybrid vehicle. The hybrid transmission 2 has a three-piece case 3 generally, in which a torque converter 4, an inputclutch device 5, an electric motor 6 and a change-gear unit 7 are arranged in this order to a coaxial relationship with a central axis of an output axle 1a of the engine 1, and in which a differential gear unit 9 is also oriented thereunder.

The torque converter 4 comprises a pump-impeller 10, a turbine-runner 11, a stator 12 and a lockup clutch 13. These components can be received in a converter case 15 which is welded together with a front cover 15a and is filled up with an oil. The case 15 is fixedly connected with the output axle 1a and has therein the turbine-runner 11. At a center portion of the torque converter 4 is provided an input axle 16 which is connected with the turbine-runner 11 and the lockup clutch 13. The stator 12 is supported on a one-way clutch, of which inner race is secured to the case 3. Between the torque converter 4 and the inputclutch device 5 is oriented a hydraulic pump 19, of which a drive gear is fixedly connected with the mentioned converter case 15.

The inputclutch device 5 is of a hydraulic multiple disk clutch C1 having a hydraulic servo C-1 and a multiple disk clutch plate. The inputclutch device 5 is adapted so that its input side 5a (a right side portion in FIG. 1) is connected with the input axle 16 and its output side 5b (a left side portion in FIG. 1) is connected to an intermediate transmission axle 22. The intermediate transmission axle 22 is oriented to a coaxial relationship with a central axis of the input axle 16 and is extending toward the change-gear unit 7. On this axle 22 via needle bearings is provided an hollow output axle 23 having a cylindrical shape in a state to rotate smoothly relative to the axle 22. The output axle 23 is loaded at a partition wall 3a of the case 3 via bearings 25. At a forward (right side) end portion of the output axle 23 and adjacent to the inputclutch device 5 is fixed a counter drive gear 26.

Meanwhile, the electric motor 6 is arranged in an inside space of the case 3 and near the partition wall 3a. The electric motor 6 essentially consists of a stator 27 fixed to the case 3 and a rotor 29 connected to the output axle 23 whereat the rotor 29 can rotate with the axle 23 when a coil 30 wound round the stator 27 is live. Incidentally, into the inside space wherein the electric motor 6 is oriented is poured the oil from oil supply ports 31, 31 at an upper portion of the case 3 in order to cool the coil 30.

At a forward (left side) end of the intermediate transmission axle 22 and at an internal space of the coil 30 is provided the change-gear unit 7. This unit 7 is of a single planetary gear 32 consisting of a sun gear S, a ring gear R and a carrier CR carrying a pinion P, the sun gear S being provided on the intermediate transmission axle 22 to rotate freely, the ring gear R being connected with the hollow output axle 23, and the carrier CR being connected with the intermediate transmission axle 22. It will be observed in FIG. 1 that there is provided a one-way clutch F between a ring member 33 integrated with the carrier CR and a boss 35 integrated with the sun gear S, the boss 35 relating to a brake B1 which comprises a hydraulic servo B-1 and plural friction plates. When the hydraulic servo B-1 will receive therein a hydraulic operating fluid, the sun gear S can stop its rotation.

The differential gear unit 9 includes a differential case 37 which is rotatable relative to the case 3. The differential case 37 is adapted to receive therein center gears 39 in a state to be rotated smoothly and to have a ring gear 40 at a periphery thereof. The case 3 relates with front axles 41l, 41r each of which laterally and rotatably extends and meshes with the center gears 39 via side gears 42l, 42r, whereby a differential mechanism can be assembled. It will be also noted that in the case 3 is provided a counter axle 43, on which a counter driven gear 45 meshing with the counter drive gear 26 and a differential drive pinion 46 meshing with the ring gear 40 are provided. It will be mentioned, however, that a lubricating oil way 47 is entirely provided for the input axle 16 and the intermediate transmission axle 22 to lubricate the needles and gears.

The above hybrid transmission 2 in this invention facilitates an operative sequence as will be explained in more detailed below.

When driving the vehicle at high speed and for a long distance in the suburbs or on a freeway, the transmission 2 is set on an engine cruising mode by means of a switch such as a mode selector. In this situation, the clutch C1 of the inputclutch device 5 is in a joining state, so that the input axle 16 and the intermediate transmission axle 22 can be connected with each other based on a command sent from a hydraulic control circuit which will be explained in detail in the following descriptions. More specifically, a rotation of the engine output axle 1a is first transmitted to the torque converter 4, secondly to the input axle 16 via an oil flow and the lockup clutch 13 in the converter 4, and lastly to the intermediate transmission axle 22 via the mentioned clutch C1.

The rotation of the intermediate transmission axle 22 is further transmitted to the output axle 23 after changing to the second gear in the change-gear unit 7 to keep high speed cruising with reference to a throttle opening extent and a actual speed of the vehicle. In a start or acceleration process of the vehicle, the brake B1 is in a free state and the carrier CR and the sun gear S can be meshed each other by means of the one-way clutch F. In this condition, the rotation of the intermediate transmission axle 22 is transmitted to the sun gear S and the ring gear R via the carrier CR and further to the output axle 23, both gears S and R being integrated with the carrier CR. In another condition where the actual vehicle speed is over a predetermined level and the throttle opening extent is lower than a predetermined degree, the brake B1 is in active to fix the sun gear S. In this condition, the rotation of the intermediate transmission axle 22 is directly transmitted to the carrier CR, the pinion P meshes with and effects a planetary motion relative to the sun gear S fixed by the brake B1, respective rotations of the carrier R and the pinion P are synergistically effects a high-speed rotation of the ring gear R, and then such over drive rotation of the ring gear R is transmitted to the output axle 23.

The rotation of the output axle 23 is transferred via the counter drive gear 26 to the driven gear 45 and further to the differential gear unit 9 via the differential drive pinion 46. The differential gear unit 9 can effect a so-called differential rotation of the laterally arranged front axles 41l, 41r.

Meanwhile, the rotation of the engine output axle 1a is transmitted via the converter case 15 to the hydraulic pump 19 to thereby generate a predetermined pressure oil. The coil 30 is not live in the mentioned engine cruising mode, so that, in the electric motor 6, the rotor 29 integrated with the output axle 23 idles. It is of course available that an elector motive force generated by such rotation of the rotor 29 is utilized to charge a battery by connecting a electric circuit of the coil 30 with the battery.

In the mean time, when the vehicle repeats start and stop in an urban area at a low speed, the transmission 2 should be set on an electric motor cruising mode by means of the switch such as a mode selector. In this mode, the clutch C1 of the inputclutch device 5 is released to cut off a rotation power transmission from the input axle 16 to the intermediate transmission axle 22 and then the coil 30 becomes live to operate the electric motor 6. The rotation of the rotor 29 in the electric motor 6 is transmitted to the output axle 23 and further to the laterally arranged front axles 41l, 41r via the counter drive gear 26, the driven gear 45, the pinion 46 and the differential gear unit 9 in this order.

In this mode, the engine 1 can keep a constant running at a low speed with a little exhaust gas and noise, and the rotation of the output axle 1a is transmitted via the converter case 15 to the hydraulic pump 19 so as to generate the predetermined pressure oil. Incidentally, the rotation of the engine output axle 1a never affect to the intermediate transmission axle 22 because the clutch C1 is released.

The hydraulic control system for the hybrid vehicle according to the present invention will be explained as follows.

Figure 2:
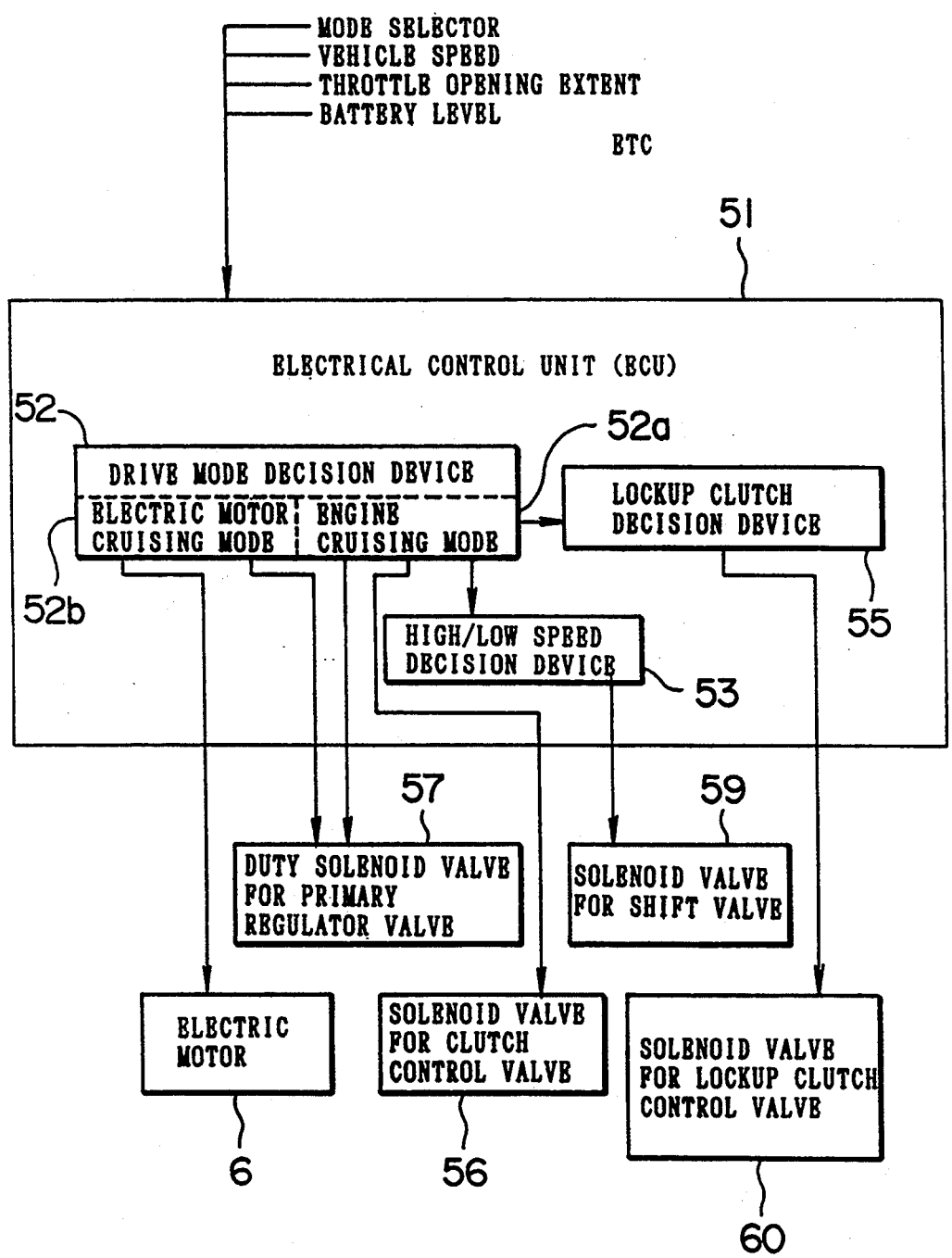
FIG. 2 is a block diagram explaining an electric control of the hydraulic circuit.

FIG. 2 is a block diagram explaining a general electrical control in this invention, in which there is denoted by 51 an electrical control unit (ECU) which is provided to receive several signals referring to an information from the mode selector, vehicle speed, throttle opening extent, battery level and so on, and which comprises a drive mode decision device 52, a high/low speed decision device 53 and a lockup clutch decision device 55. The drive mode decision device 52 can send either an engine cruising mode signal 52a or an electric motor cruising mode signal 52b manually or automatically in accordance with the actual vehicle speed. Accordingly, in the engine cruising mode, the drive mode decision device 52 sends an ON signal to a solenoid valve (normally in an opened state) controlling a clutch control valve and also sends a certain duty signal to a duty solenoid valve 57 controlling a primary regulator valve. While, in the electric motor cruising mode, the mentioned drive mode decision device 52 sends a certain drive start signal to the electric motor 6 and also sends to the duty solenoid valve 57 a signal to highly control the primary regulator valve. The high/low speed decision device 53 can be in operation under the engine cruising mode to send a signal to a solenoid valve 59 controlling a shift valve in accordance with the vehicle speed and the throttle opening extent. The lockup clutch decision device 55 is also in operation under the engine cruising mode to send a signal to a solenoid valve 60 controlling a lockup clutch control valve based on the vehicle speed and the throttle opening extent.

Figure 3:
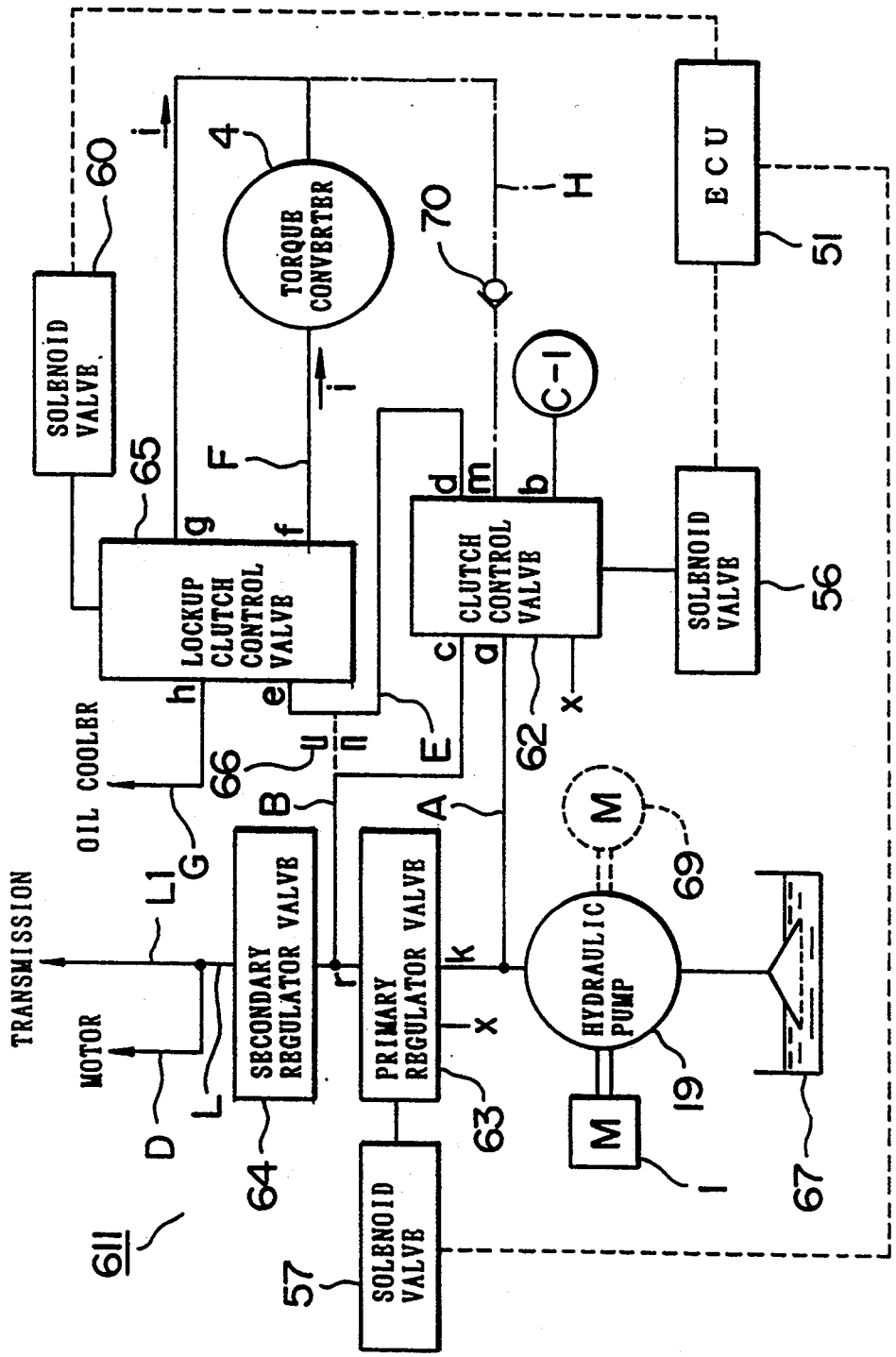
FIG. 3 is an explanatory view of the first embodiment of the hydraulic circuit.

FIG. 3 is a diagrammatic view showing a fragmentary portion of a hydraulic circuit 61l in the first embodiment according to the present invention. The circuit 61l comprises a clutch control valve 62, a primary regulator valve 63 and a lockup clutch control valve 65 which are regulated respectively by the mentioned solenoid valves 56, 57, 60. The primary regulator valve 63 has a line pressure port k which connects with a line pressure hydraulic path A relating to the hydraulic pump 19, a converter pressure port r which connects with a converter pressure (secondary pressure) hydraulic path B, and a drain port x to thereby control a line pressure in the hydraulic path A and generate a preferable converter pressure in the hydraulic path B by regulating the ports k, r, x with an aid of the control pressure from the duty solenoid valve 57. The clutch control valve 62 has a portia which connects with the line pressure hydraulic path A, a port b which connects with the hydraulic servo C-1 in the inputclutch device 5, a port c which connects with the converter pressure hydraulic path B, a port d which connects with the torque converter 4 via the lockup clutch control valve 65, and a drain port x. The clutch control valve 62 can regulate these ports with an aid of a control pressure from the solenoid valve 56. The lockup clutch control valve 65 has a port e which connects with a converter pressure hydraulic path E laying from the clutch control valve 62, ports f, g each of which supplies a different flow of the pressure oil toward the torque converter 4, and a port h which connects with an oil cooler. These ports can be shifted preferably based on the control pressure from the solenoid valve 60. Incidentally, a reference numeral 64 designates a secondary regulator valve which controls a converter pressure in the hydraulic path B and a pressure in a lubricating oil path L. The lubricating oil path L branches plural lubricating oil branch path L1 connecting with the lubricating oil way 47 provided in the hybrid transmission 2 and an oil branch path D which connects with the ports 31, 31 for cooling the electric motor 6.

The hydraulic circuit 611 as the first embodiment in FIG. 3 has such composition, so that the oil stored in an oil sump 67 of the case 3 is drawn out by the hydraulic pump 19 directly driven by the engine 1 and is then regulated as the line pressure in the hydraulic path A by means of the primary regulator valve 63 which is under control of the solenoid valve 57. In the engine cruising mode, the solenoid valve 56 is live, and the ports a–b and the ports c–d are connected each other in the clutch control valve 62. That is, the pressure oil in the hydraulic path A is fed to the hydraulic servo C-1 via the ports a and b to engage the clutch C1, and the converter pressure in the hydraulic path B is forwarded into the hydraulic path E via the ports c and d. The lockup control valve 65 can be controlled by the solenoid valve 60, that is, in an acceleration state of the vehicle, the port e1 gets through to the port f to flow the pressure oil in a direction i and the lockup clutch 13 of the torque converter 4 is cut off. While, in the normal cruising mode, the port e2 gets through to the port g to flow the pressure oil in a direction j whereat the lockup clutch 13 is in the engagement state. The converter pressure oil fed out from the port h is led to the oil cooler via an oil path G.

Meanwhile, in the electric motor cruising mode, the solenoid valve 57 is in a state to highly control the primary regulator valve 63, wherein the ports k and r are opened wide, the entire oil from the pump 19 is fed to the hydraulic path B, and the respective connections between the ports a and b and between the ports c and d are released in the clutch control valve 62. This leads the inputclutch device 5 in a released state because of no pressure oil feeding to the hydraulic servo C-1. The oil supply to the torque converter 4 is also stopped due to no pressure oil in the converter pressure hydraulic path E. Accordingly, the entire oil from the pump 19 is led to the lubricating oil path L via the hydraulic path B and the secondary regulator valve 64. The most of the thus led oil is then forwarded to the supply ports 31, 31 of the case 3 via the oil path D to cool the coil 30 effectively.

The designation 66 in FIG. 3 is an orifice, which may be provided between the hydraulic path B and the hydraulic path E. Therefore, the orifice 66 can feed a little converted pressure oil to the torque converter 4 even in the electric motor cruising mode without a linkage between the ports c and d in the clutch control valve 62. This bypass effects to shut out an intake of flesh air into the torque converter 4 whereat, at the time when the cruising mode is changed from the electric motor cruising mode to the engine cruising mode, the driving force will not be lost suddenly due to the fresh air instead of the hydraulic oil or a harm such as vibration of a vehicle body because of a sudden recovery of the driving force will not take place.

Figure 7B:
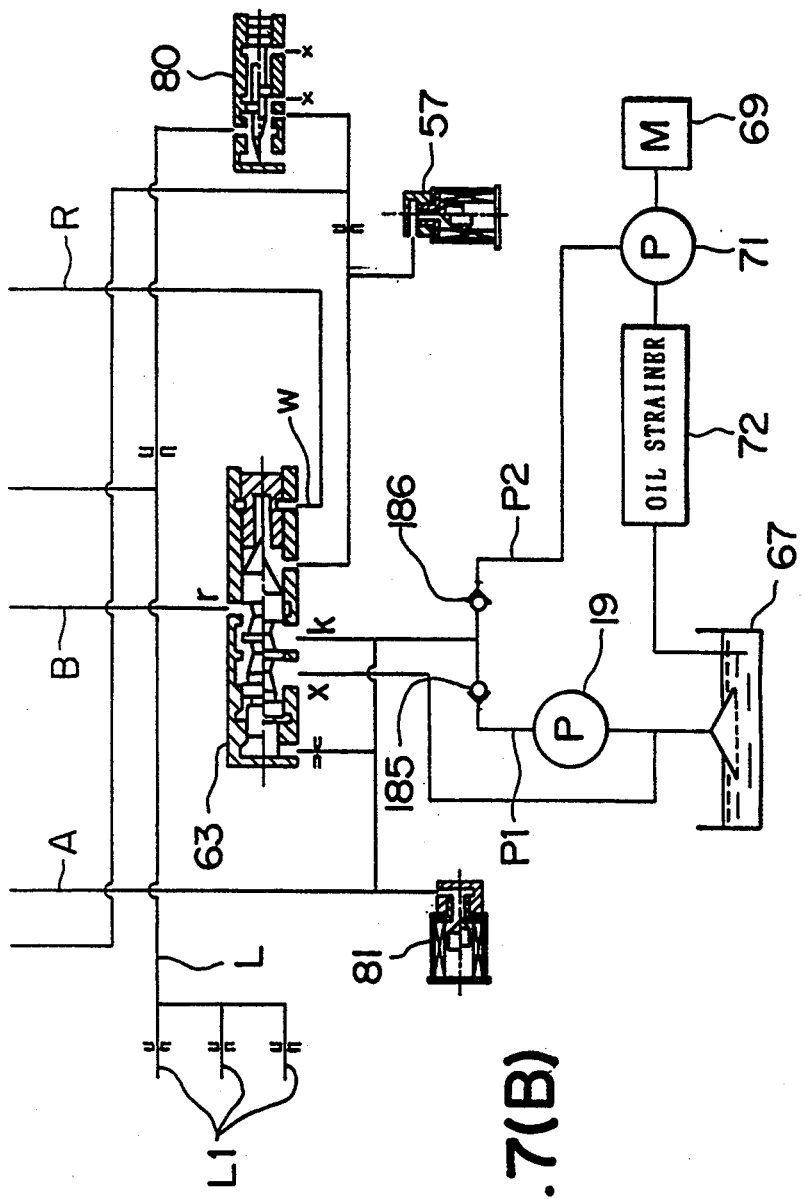

The hydraulic pump 19 may be driven by a rotation of the counter shaft 43 to work in response to the vehicle speed or may be driven by an optional and exclusive D.C. motor 69 which is described in a dotted-line in FIG. 3 in stead of being driven by the engine 1. FIG. 7(A), 7(B) which will be explained later shows another modification on this arrangement, wherein two hydraulic pumps are provided in parallel, one being driven by an exclusive D.C. motor 69 and the other being directly driven by the engine 1, so that respectively delivered pressure oil from both pumps are merged after respective check valves and sent to the primary regulator valve 63.

It will be observed in FIG. 3 that an hydraulic path H having thereon a check valve 70 may be provided as described by a dashed line. When the pressure oil supply to the torque converter 4 is cut off in the electric motor cruising mode, ports c and m are adapted to go through to each other in the clutch control valve 62 to feed the converter pressure into the hydraulic path H. The fed oil is further transported to the oil cooler to be cooled via the ports e2–h and the oil path G. It will be mentioned, however, that the oil to the motor 6 can be cooled in an optional oil cooler on the oil branch path D.

The second embodiment of the hydraulic circuit according to the present invention will be explained with reference to FIGS. 4 and 5. Incidentally, in the description of the following embodiment, the same reference numerals will be used to designate the same or similar components as those in the first embodiment, so that descriptions will be omitted or simplified.

The hydraulic circuit 612 of the second embodiment comprises a motor cooling exclusive circuit I essentially consisting of a hydraulic pump 71 driven by a D.C. motor 69, an oil strainer 72 and an oil cooler 73. There is provided an oil path L3 between the lubricating oil path L through which an oil is transported by the hydraulic pump 19 driven by the engine 1 and the oil path D to cool the coil 30. The oil path L3 has thereon a check valve 75 to control the oil flow from the lubricating oil path L to the oil path D. The oil path D also has a check valve 76 not to receive the oil flow of the oil path L3. Incidentally, the mentioned circuit I is described by a dotted-line in FIG. 1. FIG. 5 shows a diagrammatic view of the hydraulic circuit in the second embodiment, wherein the designation 77 is a manual valve, 79 is a shift valve, 80 is a solenoid modulator valve, 81 is a pressure relief valve, 82 is a cooler bypass, 83 is a check valve, 85 is an accumulator for the input-clutch device, and 86 is an accumulator for the brake.

The above circuit 612 in this invention facilitates an operative sequence as will be explained in more detailed below with reference to FIG. 5. A pressure oil from the hydraulic oil pump 19 is first regulated into the line pressure and led to the hydraulic path A by means of the primary regulator valve 63. The valve 63 can be controlled upon the control pressure in a hydraulic path J extending from the solenoid valve 57 into which the pressure oil in the hydraulic path A1 is fed via the solenoid modulator valve 80 and a strainer, so that, in the engine cruising mode, the line pressure is preferably controlled depending on an actual load the vehicle receives. The primary regulator valve 63 enables the line pressure port k to go through to the converter pressure port r within a predetermined degree. The converted pressure oil from the port r is further controlled by the secondary regulator valve 64, of which some is led to the lubricating oil path L via the ports n and o.

In the engine cruising mode, the solenoid valve 56 shifts the clutch control valve 62 to a right-half state as shown in the drawing, so that the pressure oil in the hydraulic path A2 after a D-range port of the manual valve 77 flows into the hydraulic path K and to the accumulator 85 and the hydraulic servo C-1. Accordingly, the inputclutch device 5 becomes its engagement state so as to securely transmit the drive power of the engine 1 to the front axles 411, 41r. At this time, the shift valve 79 is also shifted with an aid of the solenoid valve 59. When a spool contained in the shift valve 79 places upwardly as shown in FIG. 5, a port p connected with the line pressure hydraulic path A is closed and ports q and x go through to each other, whereby the hydraulic oil in the hydraulic servo B-1 is drained out to release the brake B1 and the change-gear unit 7 becomes into a state to directly transmit the rotation of the intermediate transmission axle 22 to the output axle 23. While, in a state that the spool is placed downwardly, the pressure oil in the hydraulic path A is transported to a hydraulic path R via the ports p and q and is fed to the accumulator 86 and the hydraulic servo B-1 for an engagement state of the brake B1. In this condition, the change-gear unit 7 is in the over-drive state.

Furthermore, while the clutch control valve 62 keeps the mentioned right-half state, the converter pressure in the hydraulic path B effects to the hydraulic path E via the ports c and d and further to the lockup clutch control valve 65. This valve 65 can be controlled by the solenoid valve 60. When the valve 65 keeps in a left-half state as shown in FIG. 5 to speed up the vehicle, the pressure oil in the hydraulic path E advances to the hydraulic path F which is laid to the torque converter 4 in an arrow i direction via ports e1 and f. At the same time, the lockup clutch 13 is disengaged. While, in a constant speed cruising, the lockup clutch control valve 65 shifts to a right-half state, so that the pressure oil in the hydraulic path E is transferred to the converter 4 via ports e2 and g along an arrow j direction. The lockup clutch is then engaged and unnecessary oil is drained from the port f. Some of the oil fed into the hydraulic path F is led to an oil path G extending to the oil cooler via a check valve 83.

In the engine cruising mode, the exclusive D.C. motor 69 is not used, but the pressure oil drawn out by the hydraulic pump 19 driven by the engine 1 is fed to the secondary regulator valve 64 and is then converted to the lubricating oil in the path L which branches to the paths L1 and D.

While, in the electric motor cruising mode, both the electric motor 6 as the drive source of the vehicle and the motor 69 to drive the pump 71 are used. Also, the solenoid valve 56 changes the state of the clutch control valve 62 from the right-half to the left-half state. The duty solenoid valve 57 also highly control the primary regulator valve 63 so that the ports k and r go through to each other. Furthermore, the ports n and o go through to each other in the secondary regulator valve 64. Accordingly, most of the hydraulic oil from the pump 19 are led to the hydraulic path B. At this time, the clutch control valve 62 in the left-half state can shut off the ports c, d and a and the oil fed from the port b is drained whereat the pressure oil in the hydraulic path B does not flow into the hydraulic path E and does not reach to the torque converter 4. The hydraulic oil in the hydraulic servo C-1 for the inputclutch device 5 is drained to disengage the clutch C1. This means that the rotation of the output axle 1a idles, except for a continuous rotation of the pump 19 and the vehicle runs with an aid of the electric motor 6.

Since no oil is transferred to the torque converter 4, the converted oil in the hydraulic path B is almost detoured to the lubricating oil path L via the secondary regulator valve 64 so as to be fed into plural lubricating oil branch path L1 via the check valve 75 and supplied to the electric motor 6 via the oil branch path D and the ports 31. The drawn up oil by the hydraulic pump 71 with an aid of the exclusive motor 69 is also fed to the lubricating oil branch path L1 and the oil branch path D via the check valve 76. As a consequence, the electric motor 6 can be cooled with plenty oil whereat the motor 6 can keep a high efficiency of operation even in a repetition of stop and start or an uphill travelling. Incidentally, the check valve 76 is useful to prevent an escape of the oil flowing in the lubricating oil path L into the oil sump 67 via the pump 71 not running.

It will be mentioned, however, that the engine 1 may be stopped not to exhaust car fumes even in the motor cruising mode. In this condition, the oil drawn up by the hydraulic pump 71 with an aid of the exclusive motor 69 can be forwarded to several portions in the transmission 2 where the lubricating oil is constantly needed via the oil cooler 73 and is also sent the electric motor 6 via the oil branch path D. Incidentally, the oil from the hydraulic pump 71 does not flow behind the check valve 75, so that the whole oil from the pump 71 can be transferred to the lubricating oil branch path L1 and the oil branch path D.

Other hydraulic circuit arrangements according to the present invention will be explained hereunder with reference to FIGS. 6 and 7.

Figure 6:
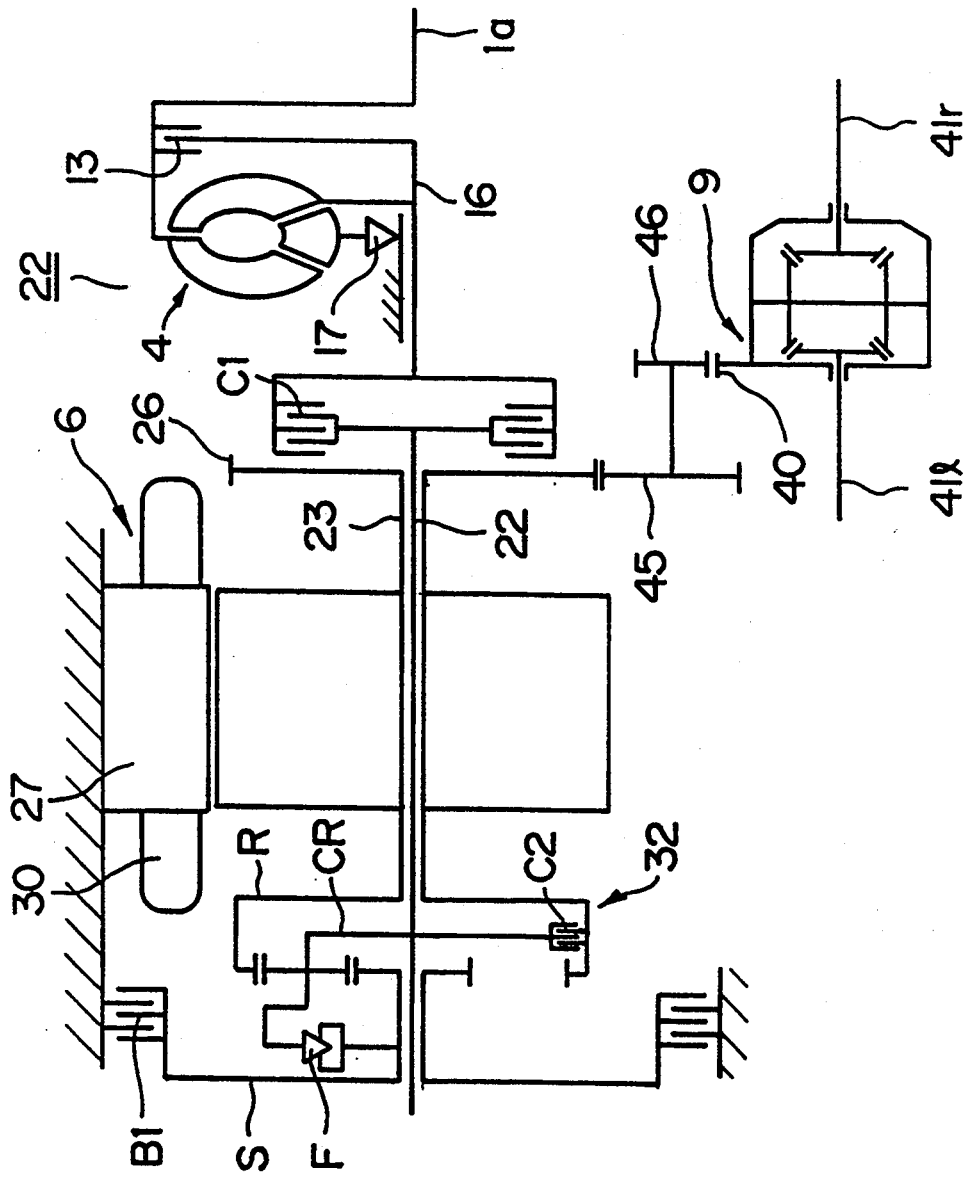
FIG. 6 is a diagrammatic view of a modified transmission.
Figure 7B:
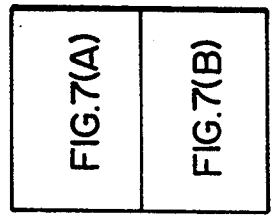

FIG. 6 is a diagrammatic view showing a modification of the transmission 22 for the hybrid vehicle, wherein there are provided, as those in the transmission 2, the torque converter 4 equipped with the lockup clutch 13, the clutch C1, the electric motor 6, the single planetary gear 32 (S, CR, R), an assembly defined by the brake B1 and the one-way clutch F, and a direct clutch C2 mechanically parallel to the one-way clutch F.

This modified transmission 22 can work almost same as in the already explained transmission 2, except for taking an engine brake in the engine cruising mode.

More specifically, in the engine cruising mode, the rotation of the output axle 1a of the engine is transmitted to the intermediate transmission axle 22 via the torque converter 4 and the clutch C1. When a direct power transmission from this axle 22 to the hollow output axle 23 is carried out, a combination with the carrier CR, the sun gear S and the ring gear R is integrated by means of the one-way clutch F or the direct clutch C2. In this modification, the carrier CR and the sun gear S can be unified by this direct clutch C2 so as to obtain the engine brake.

The third embodiment of the hydraulic circuit 613 according to the present invention is shown in FIG. 7(A), 7(B), which can be applied to the above modified transmission 22. This circuit 613 comprises the hydraulic pump 19 driven by the engine 1 and the hydraulic pump 71 driven by the exclusive D.C. motor 69 in a parallel state. Both hydraulic path P1 and P2 extending from these pump 19 and 71 are connected to the hydraulic path A via check valves 185 and 186. It will be noted in the drawing that no secondary regulator valve is prepared in this circuit but only the pressure (primary) regulator valve 63 which is controlled by the duty solenoid valve 57 is used. In this embodiment, the shift valve 79 is adapted to control the hydraulic servo B-1 for the brake B1 and a hydraulic servo C-2 for the direct clutch C2.

The clutch control valve 62 has a port a which connects with the line pressure hydraulic path A, a port b which connects with the hydraulic servo C-1 in the inputclutch device 5, ports c1, c2 which connect with the converter pressure hydraulic path B, ports d1, d2 which connect with the torque converter 4 via the lockup clutch control valve 65, and further has a port y for cooling the motor 6 and a bypass port z to thereby operate the hydraulic servo C-1 and the torque converter 4 and to feed the oil to the oil branch path D for the electric motor 6. The lockup clutch control valve 65 is under control of the solenoid valve 60. There is provided the hydraulic path N between the converter pressure hydraulic path E after the clutch control valve 62 and the line pressure hydraulic path A along with the orifice 66 thereon. The oil branch D has on its way an oil cooler 87.

Incidentally, the designation 77 is the manual valve, 80 is the solenoid modulator valve, 81 is the pressure relief valve, 82 is the cooler bypass, 85 is the accumulator for the inputclutch device, and 86 is the accumulator for the brake, 89 is an accumulator for the direct clutch C2 and 90 is a torque converter bypass.

As has been explained, the oil drawn up by the pump 19 driven by the engine 1 and the pump 71 driven by the exclusive motor 69 is first fed to the hydraulic path A via the check valves 185 and 186. The pressure in the path A can be controlled by the pressure regulator valve 63 with an aid of the duty solenoid valve 57. It is naturally available that, in the engine cruising mode, the necessary pressure oil may be generated by means of the pump 19 driven by the engine 1 without the exclusive motor 69. Otherwise, in the electric motor cruising mode, the necessary pressure oil may be generated by the pump 71 driven by the motor 69 without the pump 19. Incidentally, the oil once drawn up by the pump 19 or 71 does not flow behind the check valves 185 and 186. It is of course available not to provide the pump 19 driven by the engine in the transmission but to use the pump 71 driven by the exclusive motor 69 entirely both in the engine and electric motor cruising modes. This motor 69 is advantageous to obtain strict pressure and quantity of the hydraulic oil upon conditions.

In the engine cruising mode, the pressure regulator valve 63 controlled by the duty solenoid valve 57 regulates the oil fed into the port k to respective flows out from the drain port x and the port r. The pressure oil regulated by the valve 63 is fed to the lubricating oil way 47 in the transmission via orifices and the lubricating oil branch path L1 and to the manual valve 77. The pressure oil in the hydraulic path A can be transferred to the clutch control valve 62 via the hydraulic path A3 and to the shift valve 79 via the hydraulic path A4 when the manual valve 77 is shifted in one of "D", "2" and "L" positions. The converted pressure oil from the port r of the pressure regulator valve 63 is also fed to the clutch control valve 62.

In the mentioned engine cruising mode, the solenoid valve 56 is operated to shift the clutch control valve 62 in an upper-half state as shown in FIG. 7(A), 7(B), so that the ports a and b go through to each other and the pressure oil in the hydraulic path A3 can be fed to the accumulator 85 and the hydraulic servo C-1. The oil in the hydraulic path B is led to the hydraulic path E via the ports c1-d1 and c2-d2. There is provided a hydraulic path R branched from the hydraulic path K extending to the hydraulic servo C-1. This path R extends to the pressure regulator valve 63 and is connected with the port w to reciprocally move the spool in order to control the line pressure in the hydraulic path A and the converter pressure in the hydraulic path B.

The pressure oil in the hydraulic path E is led to the lockup clutch control valve 65. When this valve 65 is in a lower-half state as shown in the drawing by means of the solenoid valve 60, the mentioned pressure oil in the hydraulic path E is fed into the hydraulic path F along an arrow i direction via the ports e1 and f in the lockup clutch control valve 65. The oil in the hydraulic path F is fed to the converter 4 to disengage the lockup clutch 13 and is further transferred, via the ports s-g and hydraulic path Q, to the oil cooler 87 and the motor 6 through the ports 31, 31. While, in the upper-half state of the lockup clutch control valve 65, the pressure oil in the hydraulic path E is fed to the hydraulic path F via the ports e2-g along an arrow j direction to thereby engage the lockup clutch 13 in the torque converter 4. The used oil is lastly drained via the port f. Incidentally, some degree of the oil can be sent to the oil cooler 87 and the motor via the orifice 92.

When the vehicle is in an acceleration or an braking under the engine cruising mode, the shift valve 79 becomes in an upper-half state by means of the solenoid valve 59 as shown in FIG. 7(A), 7(B). Accordingly, the pressure oil in a hydraulic path A4 can reach to the accumulator 89 and the hydraulic servo C-2 to engage the direct clutch C2 whereat the change-gear unit 7 is kept in the direct drive state.

Meanwhile, the shift valve 79 changes into a lower-half state in a constant speed cruising, the pressure oil in the hydraulic path A4 is fed to the accumulator 86 and the hydraulic servo B-1 via the ports p and q whereby the brake B1 engages to keep the change-gear unit 7 in the overdrive state.

In the motor cruising mode, the ports k and r of the pressure regulator valve 63 go through to each other perfectly with an aid of the duty solenoid valve 57, so that the oil drawn up by the hydraulic pumps 19 and 71 can be fed into the hydraulic path B.

As for the clutch control valve 62, it is in the lower-half state by means of the solenoid valve 56. The oil in the hydraulic path B is then fed to the hydraulic path D via the ports c2-y. The fed oil further forwards to the motor 6 via the oil cooler 87 wherein the fed oil can be cooled whereby the coil 30 is effectively cooled. The pressure oil in the hydraulic path B is also fed to the torque converter bypass 90 via the ports c1-z and thereafter flows together with the hydraulic path E. This path E is connected to the hydraulic path A via the hydraulic path N and the orifice 66 in order to gradually supply, via the ports e1 and f of the lockup clutch control valve 65, the oil into the torque converter 4 to keep a preferable state that the converter 4 is filled up with the oil. The oil out from the converter 4 is advanced to the motor 6 after being cooled in the oil cooler 87.

As has been explained above, the pressure oil in the hydraulic path B are almost fed to the hydraulic path D by means of the clutch control valve 62 to effectively cool the motor 6 with plenty of oil, but some oil is certainly forwarded to the torque converter 4 via the orifice 66. Hence, at the time when the cruising mode is changed from the electric motor cruising mode to the engine cruising mode, the driving force will not be lost suddenly due to the fresh air instead of the hydraulic oil or a harm such as vibration of a vehicle body because of a sudden recovery of the driving force will not take place as the converter 4 can be filled up with the oil continuously.

Figure 8A:
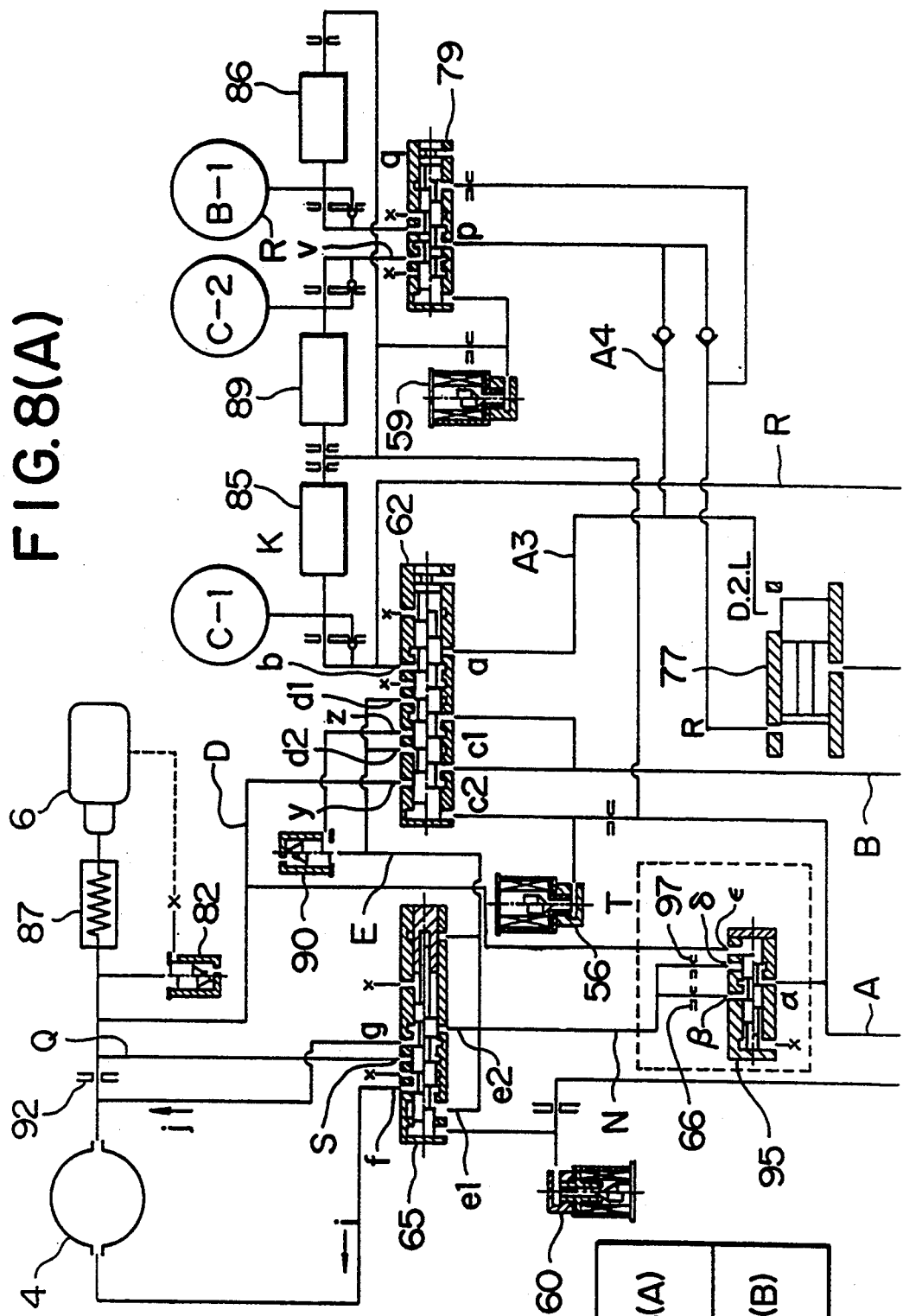
FIG. 8(A), 8(B) is a hydraulic circuit in the fourth embodiment.
Figure 8B:
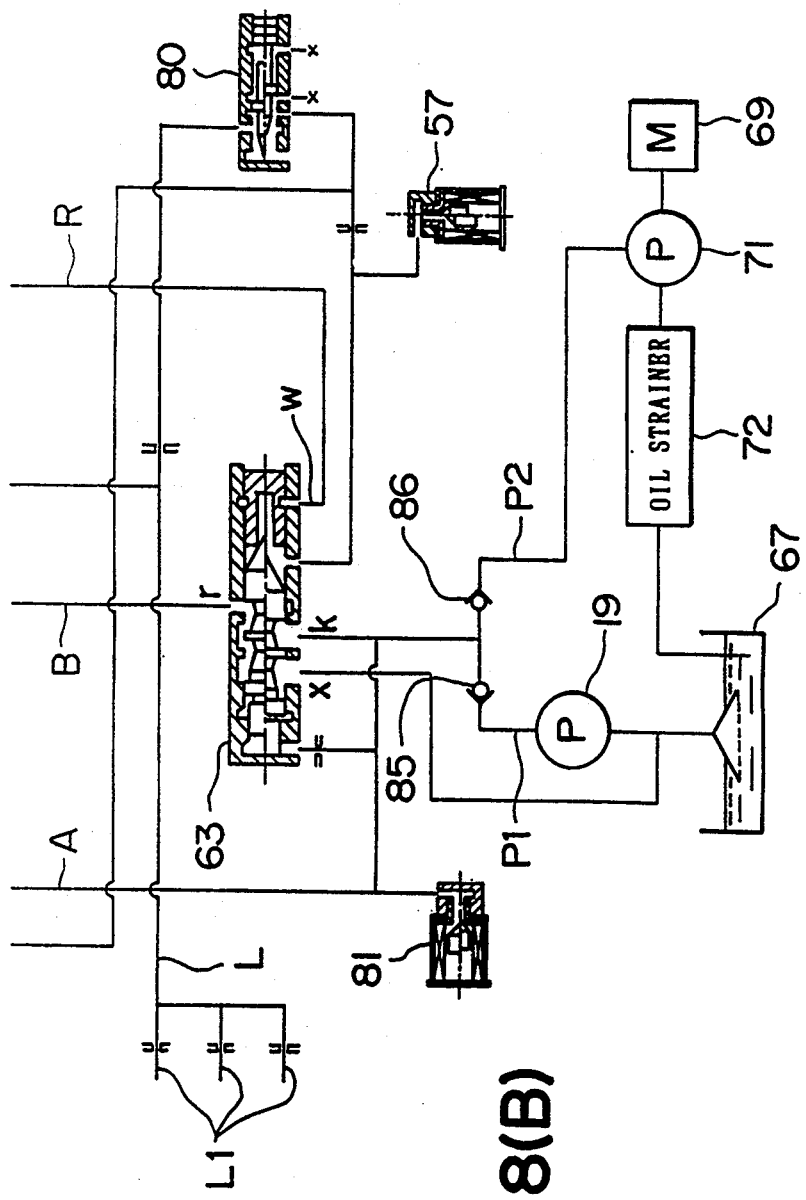
Figure 8B:
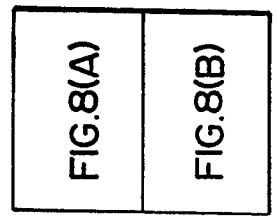

FIG. 8(A), 8(B) shows the fourth embodiment of the hydraulic circuit 614 which is partially arranged from the above third embodiment according to the present invention. It will be noted that only a different components comparing with the third embodiment are surrounded by a dotted-line. The following explanations will be done about the components.

This embodiment further comprises an orifice valve 95 having a supply port alpha connected with the line pressure hydraulic path A, a port beta connected with the hydraulic path E via a small diameter orifice 66, a port delta connected with the hydraulic path E via a large diameter orifice 97, and a control port epsilon connected with the hydraulic path D through the hydraulic path T.

According to this hydraulic circuit 614, the clutch control valve 62 is kept in the lower-half state under the motor cruising mode whereby the pressure oil in the hydraulic path B can be forwarded to the hydraulic path D and thereafter transferred to the motor 6 wherein the coil 30 is preferably cooled. Some oil in the hydraulic path D is fed into the control port epsilon of the orifice valve 95 via a hydraulic path T to shift the valve 95 in an upper-half state as shown in FIG. 8(A), 8(B). In this condition, the pressure oil in the hydraulic path A is fed to the hydraulic path E via the supply port alpha, the port beta and the small diameter orifice 66 which is adjusted to let a minimum oil flow into the torque converter 4 wherein the oil is constantly filled up.

In the engine cruising mode, the clutch control valve 62 is shifted to an upper-half state and no oil is entered into the hydraulic path D. The orifice valve 95 also receives no oil from the control port epsilon and is then in a lower-half state. The pressure oil in the hydraulic path A is fed to the hydraulic path E via the supply port alpha, the port delta and the large diameter orifice 97 which is adapted to accelerate a oil supply to the torque converter 4.

Accordingly, a minimum oil is fed to the torque converter 4 in the motor cruising mode without a waste of oil, but the rest plenty of oil is effectively fed to the motor 6. While, in the engine cruising mode, enough oil can be directly transferred from the hydraulic path A to the torque converter 4 in which a desirable cooling is carried out.

It will be mentioned, however, that another hydraulic power transmission like a fluid coupling may be employed in stead of the torque converter in the above explained embodiments.

Next, the preferred modifications of the oil paths for lubricating mechanical parts such as a single planetary gear 32, the one-way clutch F or the brake B1 accommodated in the transmission case 3 all together and for cooling the coil 30 in the electric motor 6 will be explained in detail with reference to attached FIGS. 9-12.

Figure 9:
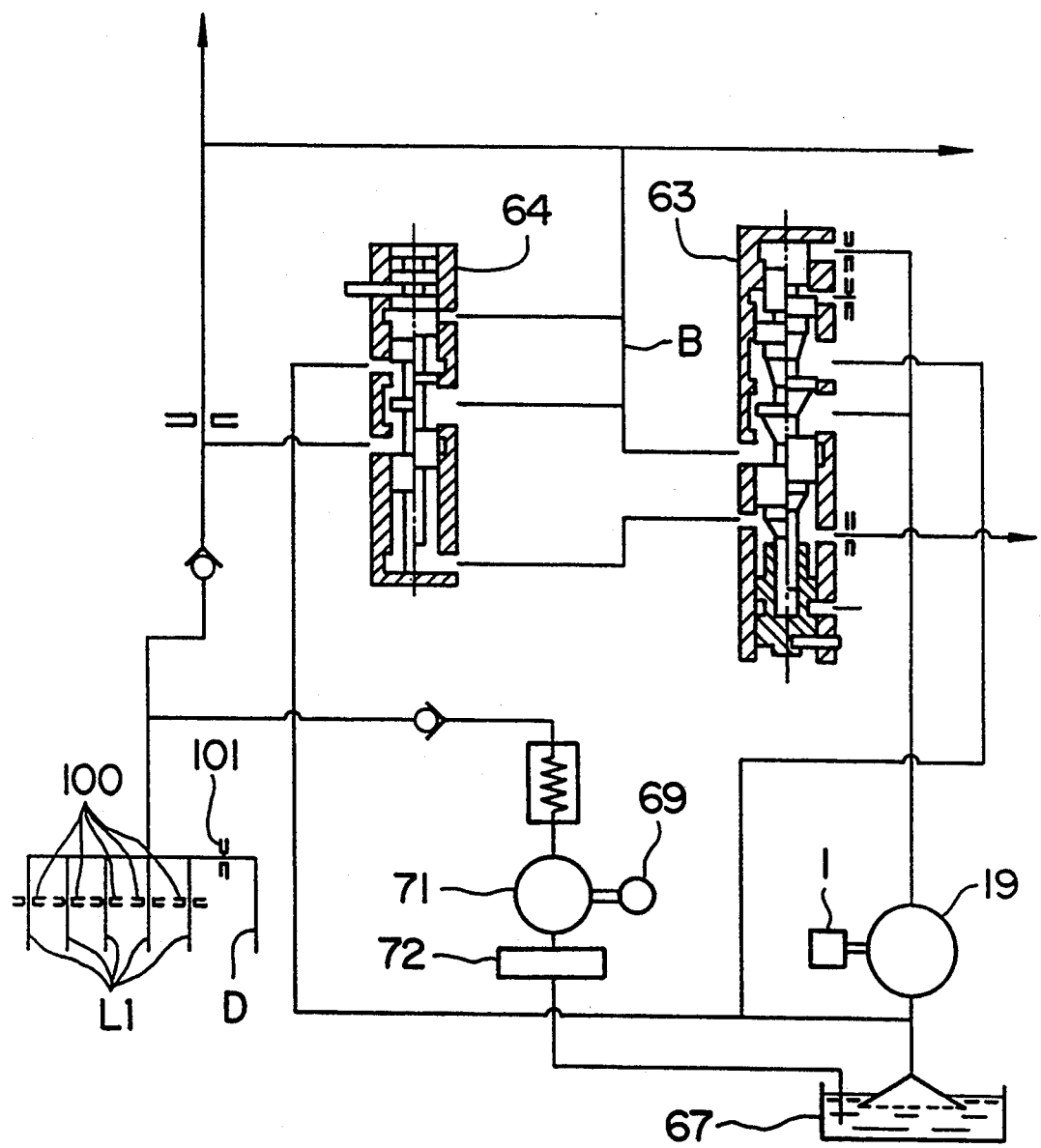
FIG. 9 is a standard assembly of oil paths both for the electric motor and the mechanical parts in the transmission.

FIG. 9 is a standard assembly of oil paths D, L1 with orifices for the electric motor 6 and the mechanical parts in the transmission case 3, of which structure is already outlined in each embodiment of the hydraulic system according to the present invention.

The converted oil after the primary regulator valve 63 is fed to the secondary regulator valve 64 through the converter pressure hydraulic path B. The oil in the hydraulic path B is further controlled by the secondary regulator valve 64 to be used in the torque converter 4 and the like. The secondary regulator valve 64 is adapted to feed some oil with a certain pressure to the oil paths L1, D via orifices 100, 101.

The oil paths L1 extend to and lubricate the needle bearings oriented between the sun gear S and the intermediate transmission axle 22, a portion where the pinion P meshing with the sun gear S and/or the ring gear R, a sliding contact portion between the pinion P and the carrier CR, a middle part between an outer race and the inner race of one-way clutches and the plural plates defining the brake B1. Each orifice 100 intermediately provided on the respective oil paths L1 is adapted to regulate the pressure of oil supplied from the secondary regulator valve 64 to a predetermined level pressure for lubricating the above-mentioned mechanical parts in the transmission 2. Hence, mechanical parts in the transmission 2 will be lubricated enough by oil comfortably regulated by the orifices 100.

The pressure oil from the secondary regulator valve 64 is also branched off and led to the oil path D through an orifice 101. The oil path D extends to the electric motor 6 via the oil supply ports 31 to cool the coil 30. The orifice 101 can control the oil flow rate to supply enough oil to the coil 30. Accordingly, the electric motor 6 will not be destroyed due to insufficient cooling.

Figure 10:
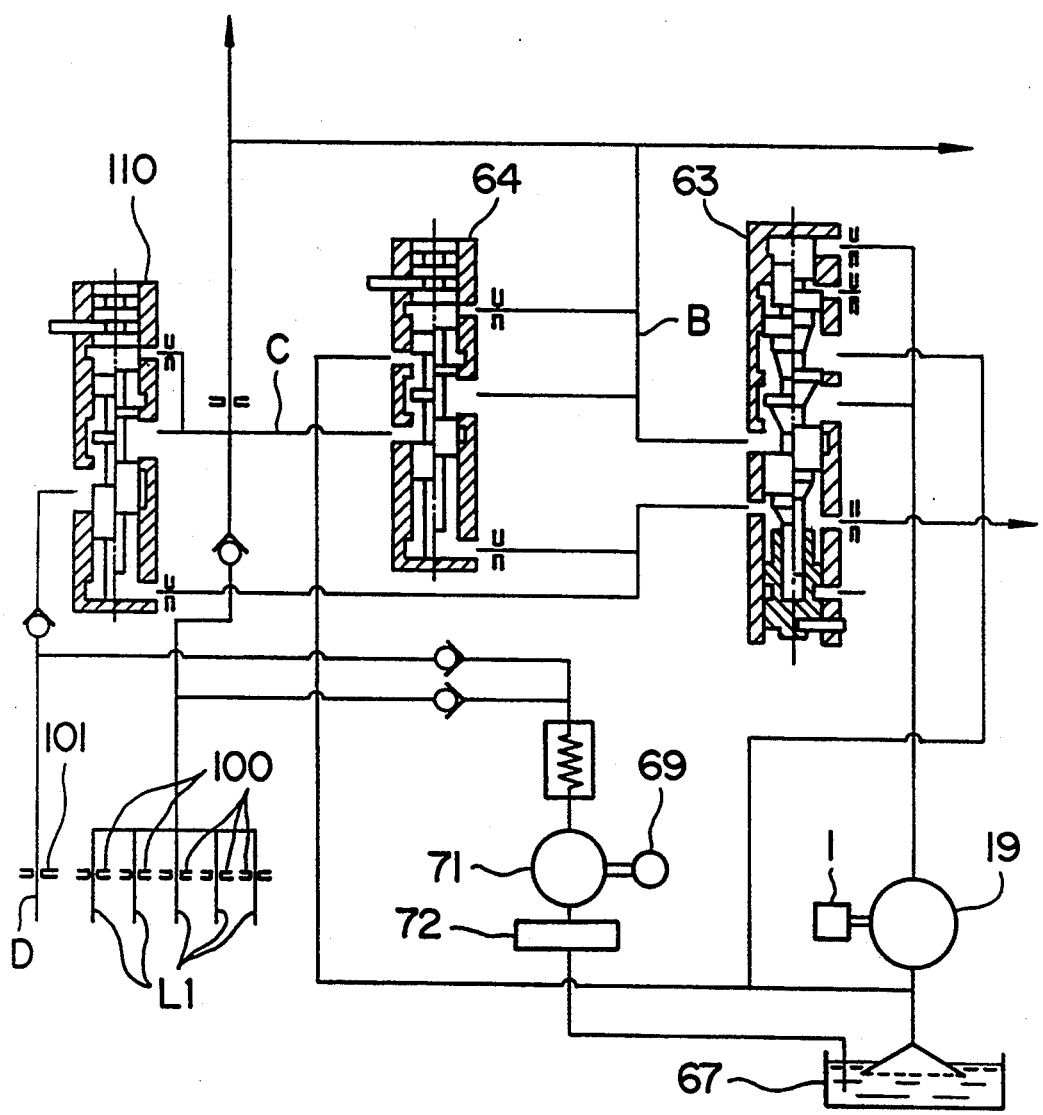
FIG. 10 is the first modified assembly of the oil paths.

FIG. 10 is the first modification of the oil paths for lubricating the mechanical parts in the transmission with the oil containing certain pressure and for cooling the coil 30 with enough quantity of oil. The difference from that in the standard assembly of oil paths depicted in FIG. 9 is that a modulator valve 110 is provided behind the secondary regulator valve 64.

The modulator valve 110 is adapted to control the pressure of oil fed, via the oil paths L1, to the mechanical parts in the case 3 and also to regulate the flow rate of the oil, via the oil path D, to the coil 30. This first modification naturally achieves the same effects as has been already explained in the standard assembly of oil paths. Incidentally, respective fine pressure adjustments of oil for each of the mechanical parts lubricated can be conducted by the orifices 100.

Figure 11:
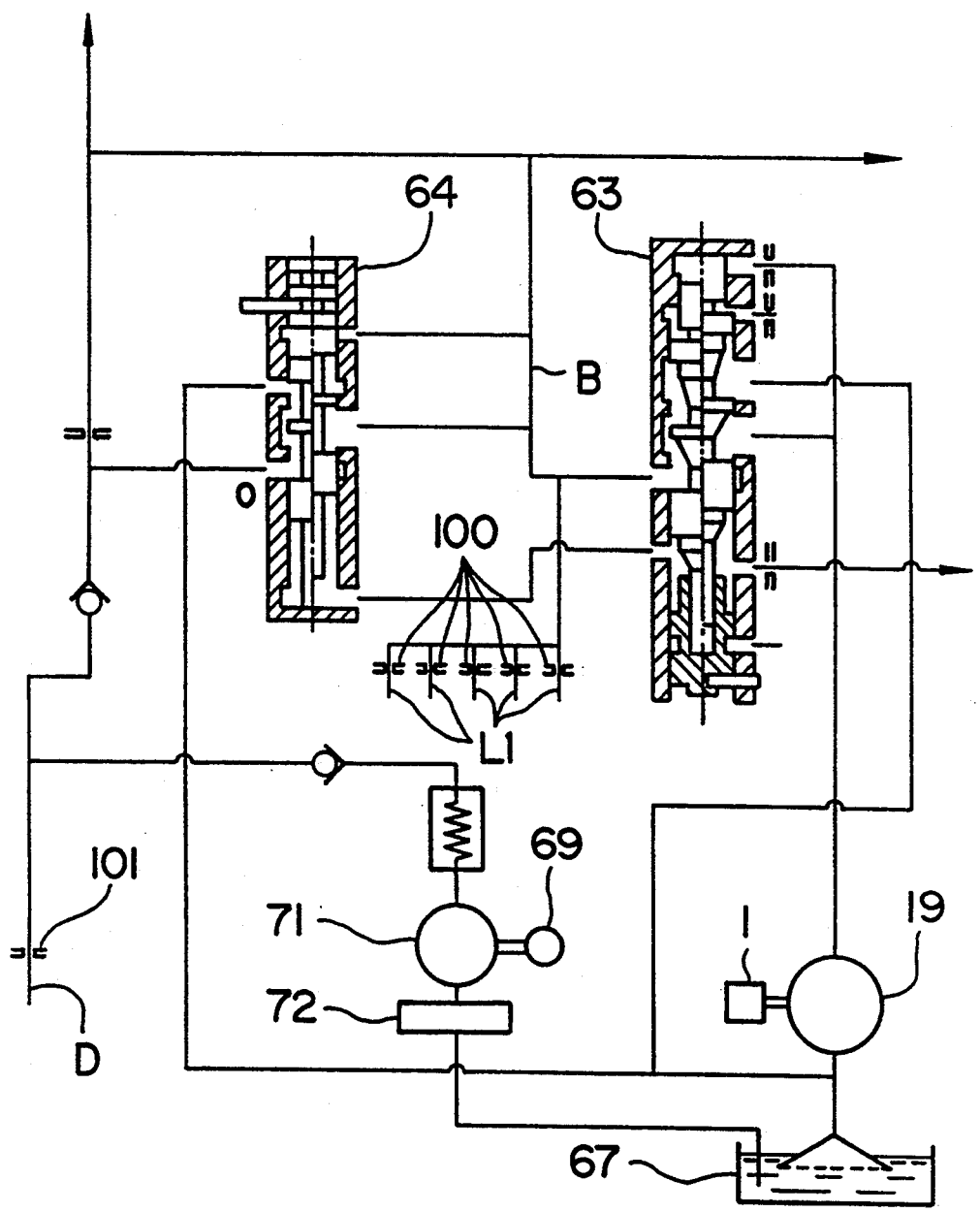
FIG. 11 is the second modified assembly of the oil paths.

FIG. 11 shows the second modification of the oil paths for lubricating the mechanical parts in the transmission 2 with the oil having certain level pressure and for cooling the coil 30 with enough quantity of oil. The difference from that in the already-explained standard assembly of the oil paths depicted in FIG. 9 is that only the oil path D for the coil 30 is connected with the port o of the secondary regulator valve 64 and that the oil paths L1 respectively provided for mechanical parts in the case 3 are connected with the converter pressure hydraulic path B via orifices 100.

In this modification, as the oil paths L1 may receive rather high pressure oil than that in other modifications due to direct connection with the hydraulic path B, but can have preferably controlled pressure oil by means of the orifices 100.

Figure 12:
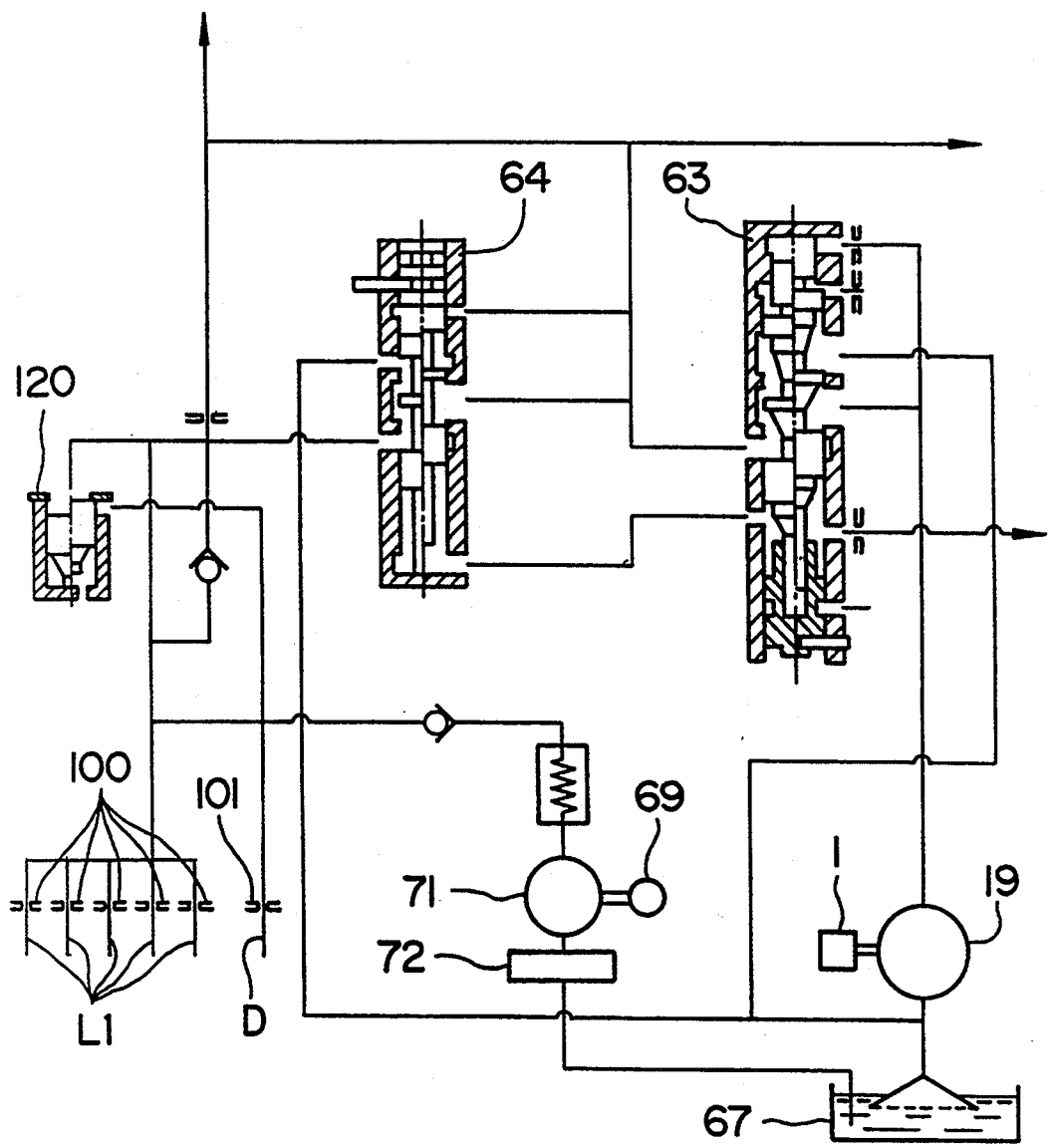
FIG. 12 is the third modified assembly of the oil paths.

FIG. 12 shows the third modification of the oil paths for lubricating the mechanical parts in the transmission 2 with the oil containing certain pressure and for cooling the coil 30 with enough quantity of oil. The difference from that in the first modification is that a relief valve 120 is employed in place of the modulator valve 110, by which effects are the same as in the first modification.

What is claimed is:

1. A hydraulic system for a hybrid vehicle, combining an internal-combustion engine and an electric motor together for selective use, wherein power of the internal-combustion engine and that of the electric motor are transmitted to a differential gear unit with drive axles through a hydraulic power transmission and an input clutch device, said hydraulic system comprising:
    a hydraulic oil pump for supplying hydraulic oil to a line pressure hydraulic path;
    a primary regulator valve having at least a line pressure port and a converter pressure port, said line pressure port connecting with said hydraulic pump and with the line pressure hydraulic path and said converter pressure port connecting with a secondary pressure hydraulic path, the extent of opening of said ports being variably controlled;
    a control valve having at least a first port which receives hydraulic oil pressure from the secondary pressure hydraulic path and a second port and means for switching said control valve between an engine cruising mode position wherein said first and second ports are in communication and an electric motor cruising mode position wherein there is no communication between said first and second ports;
    motor cooling means, including a cooling oil path, for supplying said hydraulic oil to the electric motor;
    lubricating means, including a lubricating oil path, for supplying said hydraulic oil to lubricate mechanical parts in the transmission; and
    an electrical control unit including a drive mode decision device for selecting one of an engine cruising mode in which the vehicle is moved by the engine and an electric motor cruising mode in which the vehicle is moved by the electric motor, said primary regulator valve, in the engine cruising mode, controlling the pressure in the line pressure hydraulic path and in the secondary pressure hydraulic path to said control valve and the hydraulic power transmission and, in the electric motor cruising mode, directing most of the hydraulic oil from said hydraulic oil pump to said motor cooling means with said control valve positioned to prevent communication between said first and second ports.

2. The hydraulic system according to claim 1, wherein said control valve further has a third port connecting with the line pressure hydraulic path and a fourth port connecting with a hydraulic servo for the input clutch device, whereby, in the engine cruising mode, the input clutch device is engaged by a serial opening of the third and the fourth ports and, while in the electric motor cruising mode, the input clutch device is disengaged.

3. The hydraulic system according to claim 1, wherein said control valve further has a fifth port which is shut in said engine cruising mode position with the first and the second ports communicating to direct flow of the hydraulic oil to the hydraulic power transmission, and while in the electric motor cruising mode position the first and the fifth ports communicate to direct the hydraulic oil, with the second port shut, to forward the hydraulic oil to the motor cooling means.

4. The hydraulic system according to claim 1, further comprising an orifice between the converter pressure port and an hydraulic path extending to the hydraulic power transmission.

5. The hydraulic system according to claim 1, wherein both said lubricating oil path and said cooling oil path have orifices.

6. The hydraulic system according to claim 5 wherein said lubricating means includes a plurality of lubricating oil paths, each of which is provided with an orifice.

7. The hydraulic system according to claim 1, further comprising a secondary regulator valve for regulating the pressure of the hydraulic oil feed to said lubricating oil path and said cooling oil path.

8. The hydraulic system according to claim 7, wherein said secondary regulator valve is a modulator valve.

9. The hydraulic system according to claim 7, wherein said secondary regulator valve is a relief valve.

10. The hydraulic system according to claim 1, wherein said lubricating oil path is connected with the line pressure port of said primary regulator valve and wherein said cooling oil path is connected with the converter pressure port of said regulator valve.

* * * * *

UNITED STATES PATENT AND TRADEMARK OFFICE
CERTIFICATE OF CORRECTION

PATENT NO. : 5,415,603            Page 1 of 10

DATED : May 16, 1995

INVENTOR(S) : Tuzuki et al

It is certified that error appears in the above-identified patent and that said Letters Patent is hereby corrected as shown below:

The title page showing the illustrated figures should be deleted and substituted with the attached title page, showing the illustrated figures.

Columns 1 thru 16 should be deleted and replaced with the attached columns 1 thru 16.

Signed and Sealed this

Twenty-third Day of January, 1996

Attest:

BRUCE LEHMAN

*Attesting Officer*      *Commissioner of Patents and Trademarks*

United States Patent [19]

Tuzuki et al.

[11] Patent Number: 5,415,603
[45] Date of Patent: May 16, 1995

[54] HYDRAULIC CONTROL SYSTEM FOR HYBRID VEHICLE

[75] Inventors: Shigeo Tuzuki; Miyoshi Kawaguchi, both of Aichi, Japan

[73] Assignee: Kabushikikaisha Equos Research, Japan

[21] Appl. No.: 37,044

[22] Filed: Mar. 25, 1993

[30] Foreign Application Priority Data

Apr. 1, 1992 [JP] Japan ............................ 4-080063
Oct. 30, 1992 [JP] Japan ............................ 4-315819

[51] Int. Cl.⁶ ........................................ B60K 41/06
[52] U.S. Cl. ................................... 477/5; 477/138
[58] Field of Search .............. 477/2, 3, 5, 127, 130, 477/131, 138

[56] References Cited

U.S. PATENT DOCUMENTS

| | | | |
|---|---|---|---|
| 3,465,614 | 9/1969 | Reynolds | 477/130 |
| 3,592,083 | 7/1971 | Kawabata | 477/130 |
| 3,757,912 | 9/1973 | Ball, Jr. et al. | 477/5 |
| 4,533,011 | 3/1985 | Heidemeyer et al. | |
| 4,702,032 | 11/1987 | Harada et al. | 477/138 |
| 4,829,853 | 5/1989 | Sakaguchi | 477/127 |
| 5,010,991 | 4/1991 | Tsukamoto et al. | 192/3.3 |
| 5,127,485 | 7/1992 | Wakuta et al. | 180/65.5 |

FOREIGN PATENT DOCUMENTS

63901 4/1984 Japan
104403 5/1987 Japan

*Primary Examiner*—John T. Kwon
*Attorney, Agent, or Firm*—Lorusso & Loud

[57] ABSTRACT

A hydraulic control system for a transmission in a hybrid vehicle combining an internal-combustion engine and an electric motor. In an engine cruising mode, a clutch control valve feeds oil pressure from a hydraulic path A to a hydraulic servo for engagement of an input clutch device and also feeds oil in from a hydraulic path B to the torque converter. While, in an electric motor cruising mode, the input clutch device 5 is disengaged and no oil is supplied to the torque converter so that almost all the hydraulic oil may be used to cool the motor.

10 Claims, 15 Drawing Sheets

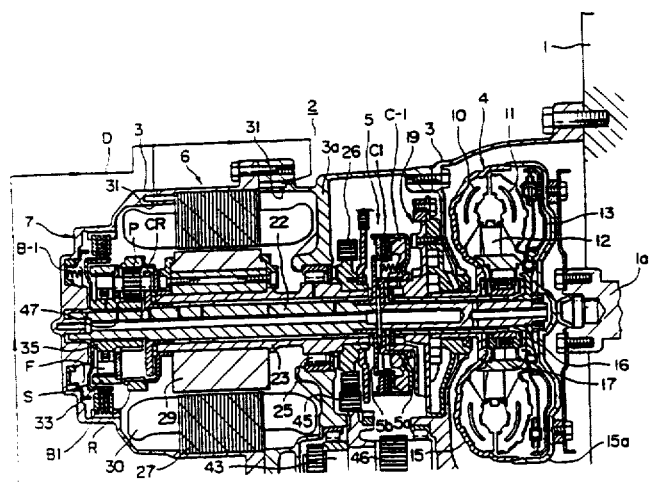
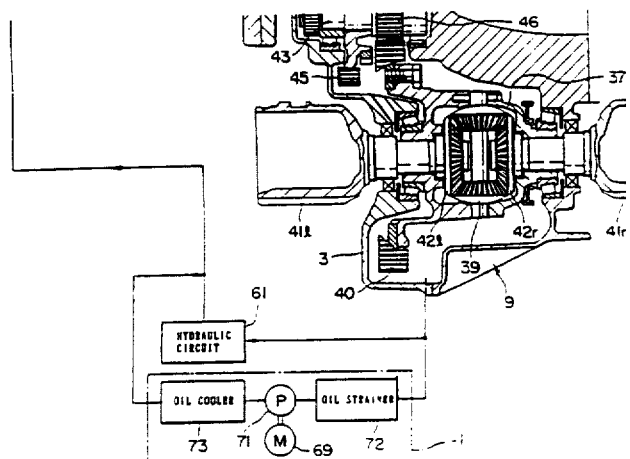

HYDRAULIC CONTROL SYSTEM FOR HYBRID VEHICLE

BACKGROUND OF THE INVENTION

1. Field of the Invention

This invention is broadly concerned with a so-called hybrid vehicle which has a combined power source consisting of an internal-combustion engine such as a gasoline or diesel engine and an electric motor driven by electrical energy stored in a battery. More specifically, the invention is a hydraulic control system for use in the hybrid vehicle, which has a power transmitting mechanism such as a torque converter behind an output axle of the engine, and which can cool the electric motor.

2. Description of the Related Art

It is known that most vehicles are driven by an internal-combustion engine, such as the gasoline or diesel engine, in which fuel is burned. The internal-combustion engine is preferred for its high power long distance driving, but inevitably makes noise and produces exhaust gas including $No_x$, $CO_2$ and other pollutants while running.

With a view toward protecting the environment, a new type vehicle using an electric motor with no noise or exhaust gas has been developed. However, a conventional electric vehicle requires a heavy battery, which has limited electric capacity and which is inferior to the internal-combustion engine from the viewpoint of driving power which is needed to accelerate, to run under an overload, and to continue travelling at a high speed. A fatal problem in the electric vehicle is that it cannot be used in various situations, since it does not provide a long cruising range on one battery charge.

In view of the foregoing deficiencies of electric vehicles, hybrid vehicles containing the internal-combustion engine and the electric motor, have been proposed. There are two types of such hybrid vehicles, one being a series-type (see Japanese Patent Laid-open No. Sho 62-104403) wherein the vehicle is moved by a power from the electric motor which is constantly rotated by the internal-combustion engine, and the other being a parallel-type (see Japanese Patent Laid-open No. Sho 59-63901 and U.S. Pat. No. 4,533,011) wherein the internal-combustion engine and the electric motor are parallel and selectively connected with the drive wheels of the vehicle.

Known cooling systems for the electric motor used in such hybrid vehicles can be grouped into, for example, air-cooled types, oil-cooled types and water-cooled types. But, all such cooling systems are provided only for (dedicated to) the electric motor, and do not utilize oil used in the power transmitting mechanism behind the engine. The plurality of axles, bearings, and one-way clutches employed in the transmission do not need much oil for lubrication, i.e. for smooth operation and cooling, but do require a minimum oil pressure. The electric motor does not need such oil pressure but does require oil for its cooling.

However, because a hybrid vehicle provides only limited space for oil storage, difficulty has been encountered in the conventional hybrid vehicle in attempting to provide sufficient circulation of oil for both the transmission and the electric motor, so that the electric motor did not receive sufficient oil and the several axles, bearings and one-way clutches employed in the transmission were not sufficiently lubricated due to insufficient oil pressure.

SUMMARY OF THE INVENTION

Accordingly, it is an object of the present invention to provide a hydraulic control system for a hybrid vehicle, wherein oil used in the power transmitting mechanism behind the engine is appropriated both for cooling the electric motor with a sufficient quantity of oil and for lubricating mechanical parts in the transmission with oil at a sufficient pressure.

The present invention provides a hydraulic control system for a hybrid vessel which combines an internal-combustion engine 1 and an electric motor 6 together and uses them selectively for drive power. The output of the internal-combustion engine 1 is finally transmitted to a differential gear unit 9 with drive axles 41$l$, 41$r$ through a hydraulic power transmission such as a torque converter 4 and an input clutch device 5 and the output of the electric motor 6 is finally transmitted to the same. The hydraulic system includes a regulator valve 63 having at least two ports k and r, of which one port k is a line pressure port connecting with at least one hydraulic oil pump 19, 71 and with a line pressure hydraulic path A and the other port r is a converter pressure port connecting with a converter pressure hydraulic path B, with the extent of opening of the two ports k and r being variably controlled responsive to conditions. The hydraulic control system further includes a control valve 62 having at least two ports c and d which may be positioned so that the hydraulic oil from the converter pressure hydraulic path B is fed to the first port c and successively fed out from the second port d or positioned so that no hydraulic oil is fed into and out. An oil path D supplies the oil to the electric motor 6 to cool coil 30 of the electric motor. An electrical control unit ECU includes a drive mode decision device 52 for selecting, as a cruising mode, either an engine cruising mode in which the vehicle is moved by the engine 1 or an electric motor cruising mode in which the vehicle is moved by the electric motor 6. In the engine cruising mode, the regulator valve 63 controls the pressure in the line pressure hydraulic path A and in the converter pressure hydraulic path B to the control valve 62 and the hydraulic power transmission 4 and, in the electric motor cruising mode, the regulator valve 63 directs almost all the hydraulic oil from the hydraulic pump 19, 71 to oil path D for cooling the electric motor 6, with the control valve positioned to block flow of hydraulic oil.

The control valve 62 in this hydraulic system should have the third port a connecting with the line pressure hydraulic path A and a fourth port b connecting with a hydraulic servo C-1 for the input clutch device 5, whereby, in the engine cruising mode, the input clutch device 5 is engaged by a serial opening of the third and the fourth ports a, b and, while in the electric motor cruising mode, the input clutch device 5 is in a disengaged state.

And as will be noted with reference to FIGS. 7(A), 7(B), 8(A) and 8(B), the control valve 62 preferably has a fifth port y, so that in the engine cruising mode the first and the second ports c1, d1 communicate to direct flow of the hydraulic oil therein to the hydraulic power transmission 4 while the fifth port y is shut. In the electric motor cruising mode the first and the fifth ports c2, y communicate to forward the hydraulic oil to the electric motor 6 with second port d shut.

The hydraulic system according to the present invention is preferably provided with an orifice between the line pressure hydraulic path A or the converter pressure path B and a hydraulic path extending to the hydraulic power transmission 4.

Accordingly, in the engine cruising mode, the input clutch device 5 is in an engagement state whereby rotation of an output axle 1a of the engine 1 is transferred to the (front) drive axles 41l, 41r via the hydraulic power transmission 4 and the input clutch device 5. The control valve 62 feeds the oil from the hydraulic path A to the hydraulic servo C-1 for the input clutch device 5 and forwards the oil from the converter pressure hydraulic path B to the hydraulic power transmission 4.

In the electric motor cruising mode, the input clutch device is disengaged and the electric motor 6 is operated to drive the axles 41l, 41r. In this mode, the pressure regulator valve 63 passes the oil through the ports k and r to thereby feed the oil to the converter pressure hydraulic path B. The first and second ports c, d in the control valve 62 are shut to cut off oil to the torque converter 4 and almost all oil in the converter pressure hydraulic path B, downstream of the pressure regulator valve 63, is fed to the oil path D leading to the electric motor 6.

BRIEF DESCRIPTION OF THE DRAWINGS

Figure 1B:
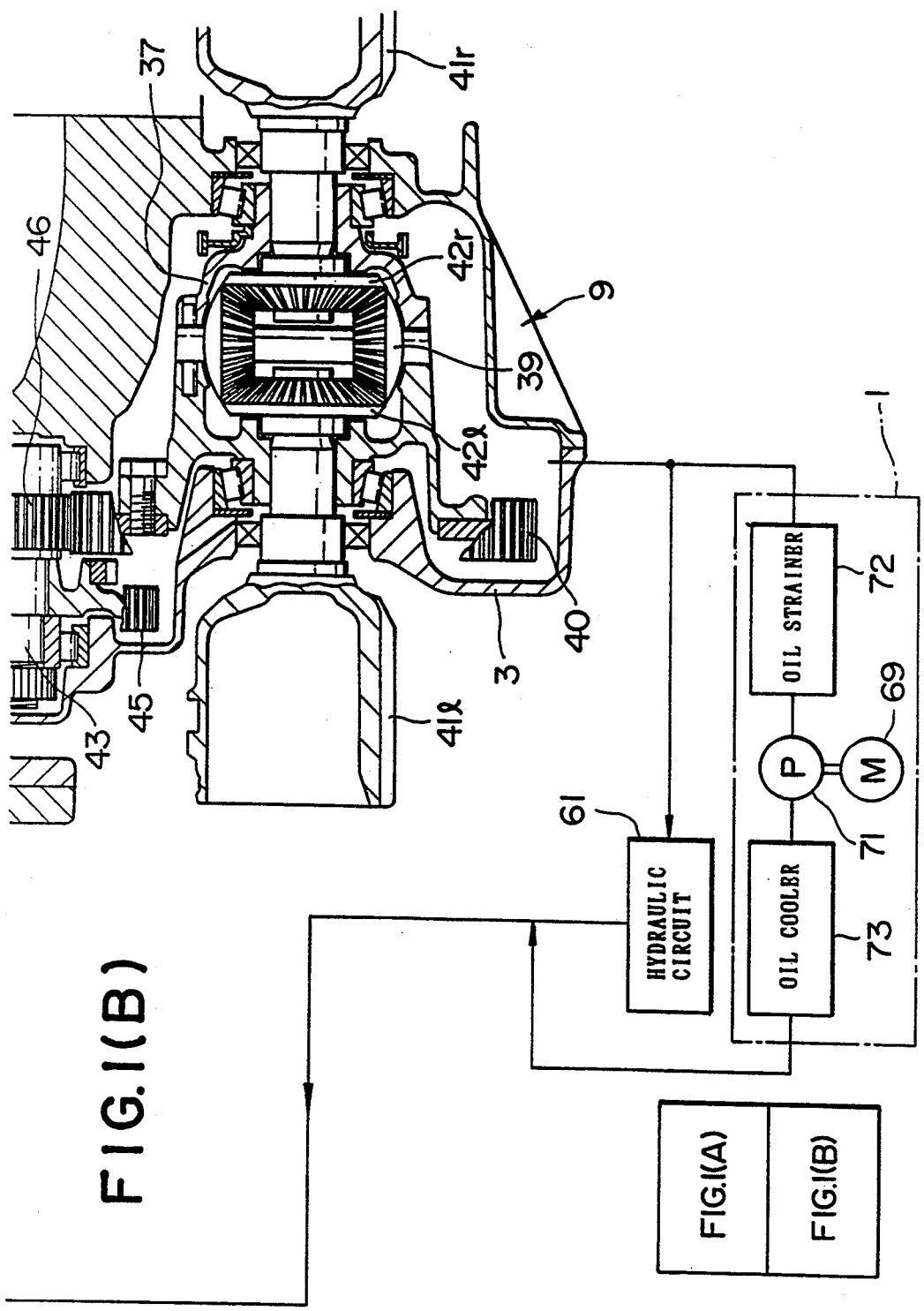
Figure 4:
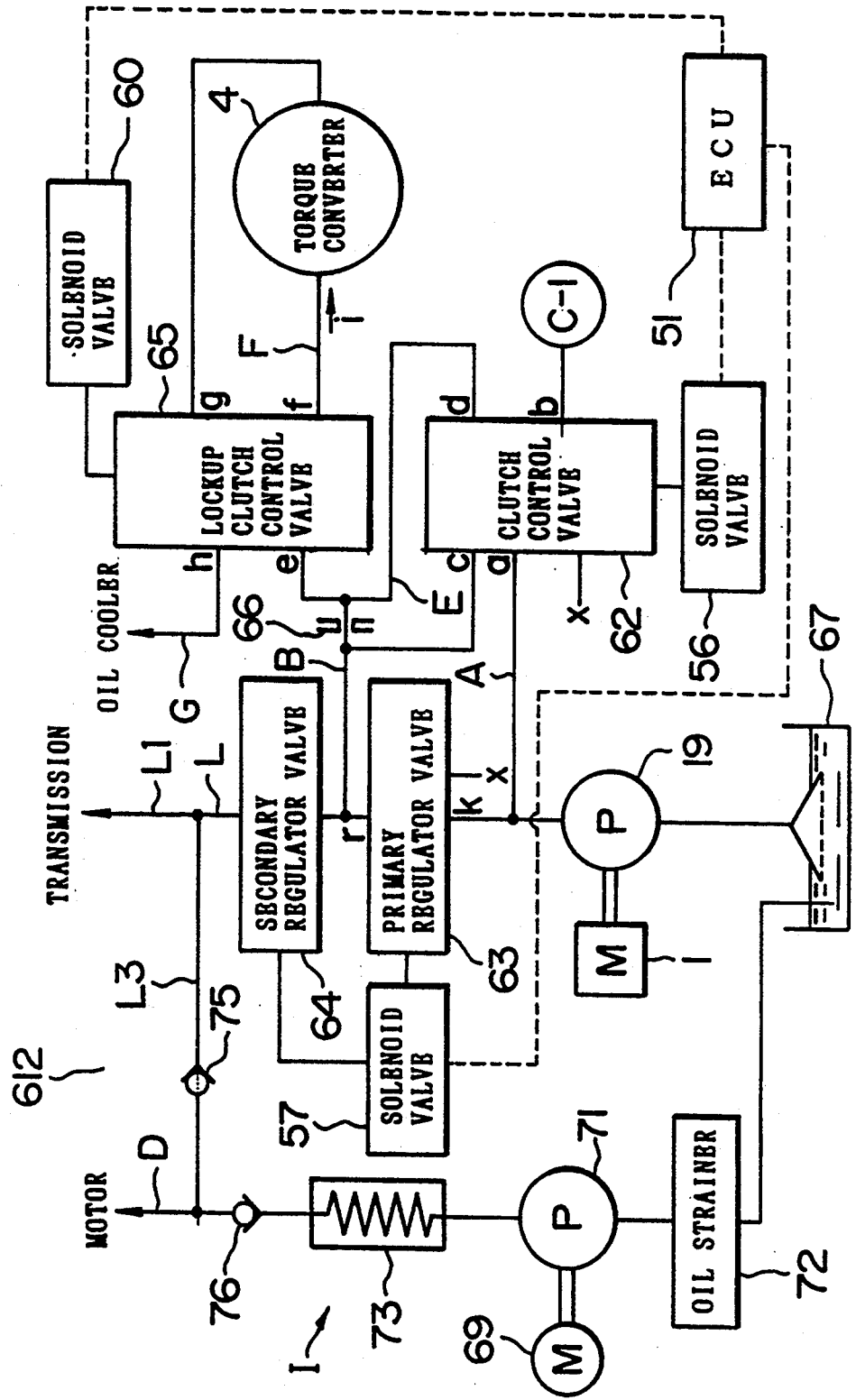
FIG. 4 is an explanatory view of the second embodiment of the hydraulic circuit.
Figure 5:
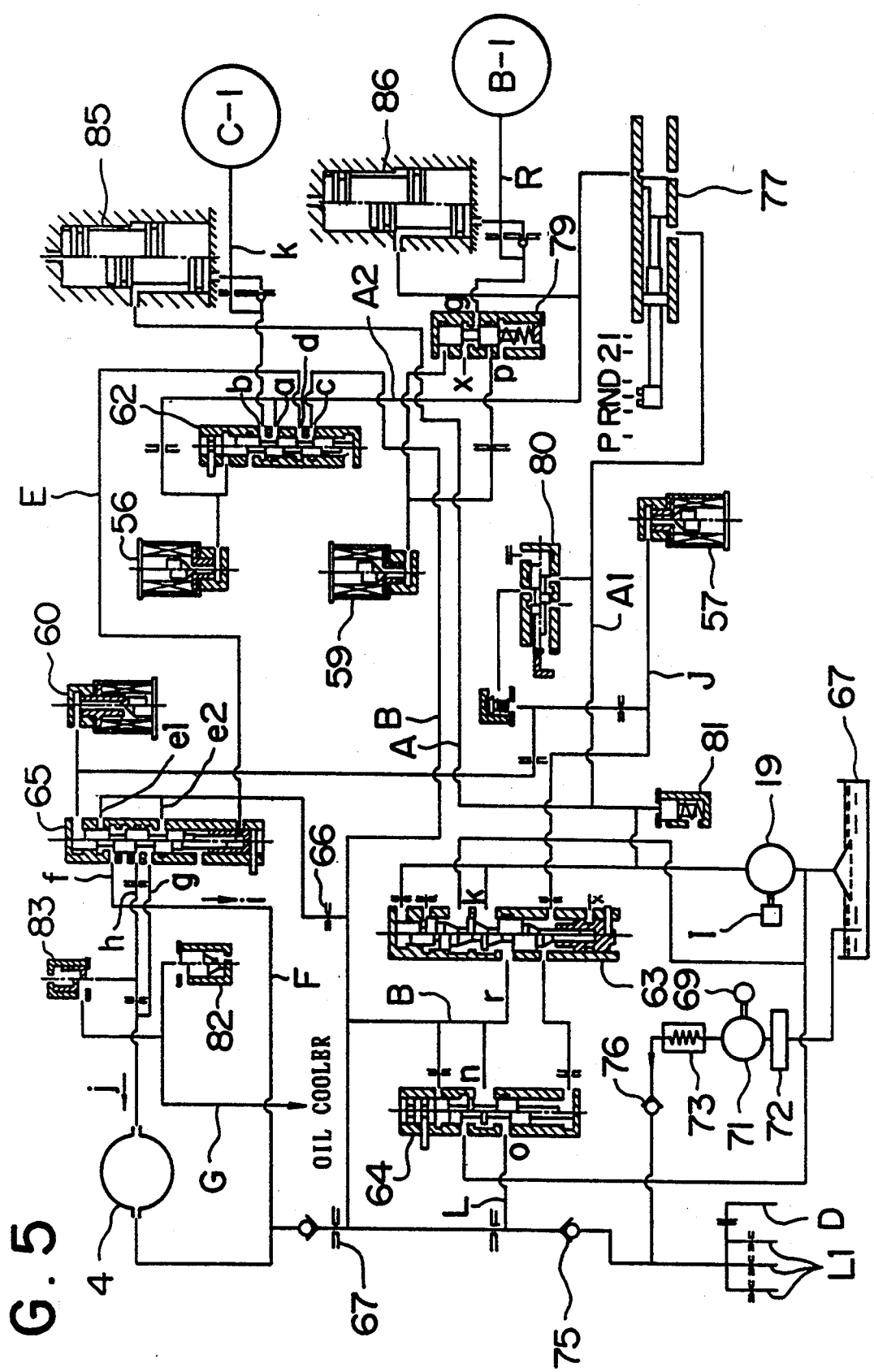
FIG. 5 is a hydraulic circuit in the second embodiment.

FIG. 1(A) and FIG. 1(B) together provide both a sectional view of the entire transmission in a hybrid vehicle and show a diagrammatic view of the second embodiment of the hydraulic circuit according to the present invention;

FIG. 2 is a block diagram of an electric control system for the hydraulic circuit;

FIG. 3 is a schematic view of the first embodiment of the hydraulic circuit;

FIG. 4 is a schematic view of the second embodiment of the hydraulic circuit;

FIG. 5 is a hydraulic circuit diagram of the second embodiment;

FIG. 6 is a diagrammatic view of a modified transmission;

FIGS. 7(A) and 7(B) are a hydraulic circuit diagram of the third embodiment;

FIGS. 8(A) and 8(B) are a hydraulic circuit diagram of the fourth embodiment;

FIG. 9 is a hydraulic circuit diagram showing a standard assembly of oil paths both for the electric motor and for the mechanical parts in the transmission;

FIG. 10 is a hydraulic circuit diagram of a first modification of the assembly of the oil paths of FIG. 9;

FIG. 11 is a hydraulic circuit diagram of a second modification of the assembly of the oil paths of FIG. 9; and FIG. 12 is a hydraulic circuit diagram of a third modification of the assembly of the oil paths of FIG. 9.

DETAILED DESCRIPTION OF THE PREFERRED EMBODIMENT(S)

A preferred embodiment of the present invention will now be described with reference to the drawings.

FIGS. 1(A) and 1(B) show a hybrid transmission 2 which is disposed adjacent to an internal-combustion engine 1 such as a gasoline or diesel engine mounted sideways under the hood of a hybrid vehicle. The hybrid transmission 2 has a three-piece case 3, in which a torque converter 4, an input clutch device 5, an electric motor 6 and a change-gear unit 7 are arranged coaxially in this order about the central axis of an output axle 1a of the engine 1, and in which a differential gear unit 9 is also provided.

The torque converter 4 includes a pump-impeller 10, a turbine-runner 11, a stator 12 and a lockup clutch 13. These components are housed in a converter case 15 which is welded together with a front cover 15a and is filled with oil. The case 15 is fixed to the output axle 1a and to the turbine-runner 11. Coaxial with the torque converter 4 is an input axle 16 which is connected with the turbine-runner 11 and the lockup clutch 13. The stator 12 is supported on a one-way clutch, of which the inner race is secured to the case 3. Between the torque converter 4 and the input clutch device 5 is a hydraulic pump 19 having a drive gear fixed to the converter case 15.

The input clutch device 5 is a hydraulic multiple disk clutch C1 having a hydraulic servo C-1 and multiple disk clutch plates. The input clutch device 5 is adapted so that its input side 5a (right side in FIG. 1) is connected with the input axle 16 and its output side 5b (left side in FIG. 1) is connected to an intermediate transmission axle 22. The intermediate transmission axle 22 is axially aligned with the input axle 16 and extends therefrom toward the change-gear unit 7. On this axle 22 is provided a cylindrical, hollow output axle 23 mounted via needle bearings to rotate smoothly relative to the axle 22. The output axle 23 is supported at a partition wall 3a of the case 3 via bearings 25. At a forward (right side) end portion of the output axle 23 and adjacent to the input clutch device 5 is fixed a counter drive gear 26.

The electric motor 6 is arranged inside the case 3, near the partition wall 3a. The electric motor 6 essentially consists of a stator 27 fixed to the case 3 and a rotor 29 connected to the output axle 23, whereby the rotor 29 can rotate with the axle 23, responsive to current through a coil 30 wound around the stator 27. The space housing the electric motor 6 receives oil from oil supply ports 31, 31 at an upper portion of the case 3 in order to cool the coil 30.

At the forward (left side) end of the intermediate transmission axle 22 is provided a change-gear unit 7. This unit 7 is a single planetary gear set 32 consisting of a sun gear S, a ring gear R and a carrier CR carrying a pinion P, the sun gear S being mounted on the intermediate transmission axle 22 and freely rotatable relative thereto, the ring gear R being connected with the hollow output axle 23, and the carrier CR being connected with the intermediate transmission axle 22. A one-way clutch F is provided between a ring member 33 integrated with the carrier CR and a boss 35 integrated with the sun gear S, the boss 35 being connected to a brake B1 which includes a hydraulic servo B-1 and plural friction plates. When the hydraulic servo B-1 receives hydraulic pressure, the rotation of the sun gear S is stopped.

The differential gear unit 9 includes a differential case 37 which is rotatable relative to the case 3. The differential case 37 houses rotatably mounted center gears 39 and has a ring gear 40 around its periphery. The case 3 is connected to front axles 41l, 41r each of which extends laterally and rotatably and meshes with the center gear 39 via one of side gears 42l, 42r. It will be also noted that the case 3 supports a counter axle 43, which carries a counter driven gear 45 meshing with the counter drive gear 26 and a differential drive pinion 46 meshing with the ring gear 40. A lubricating oil way 47 provides the entirety of oil to the input axle 16 and the intermediate transmission axle 22 for lubrication of the needles and gears.

When driving the vehicle at high speed and for a long distance in the suburbs or on a freeway, the transmission 2 is set in an engine cruising mode by means of a switch such as a mode selector. In this mode, the clutch C1 of the input clutch device 5 is engaged, so that the input axle 16 and the intermediate transmission axle 22 are connected responsive to a command from a hydraulic control circuit, to be explained in the following. More specifically, rotation of the engine output axle $1a$ is first transmitted to the torque converter 4, secondly to the input axle 16, either fluidically or via the lockup clutch 13, and lastly to the intermediate transmission axle 22 via the clutch C1.

The rotation of the intermediate transmission axle 22 is further transmitted to the output axle 23, after changing to the second gear speed in the change-gear unit 7, to maintain high speed cruising, in accordance with the extent of throttle opening. In a start or acceleration of the vehicle, the brake B1 is disengaged and the carrier CR and the sun gear S are meshed with each other by means of the one-way clutch F. The rotation of the intermediate transmission axle 22 is transmitted to the sun gear S and the ring gear R via the carrier CR and further to the output axle 23, both gears S and R being integrated with the carrier CR. Where the actual vehicle speed is over a predetermined value and the extent of throttle opening is lower than a predetermined degree, the brake B1 is engaged to fix the sun gear S. In this condition, the rotation of the intermediate transmission axle 22 is directly transmitted to the carrier CR, the pinion P meshes with and effects a planetary motion relative to the sun gear S fixed by the brake B1, respective rotations of the carrier R and the pinion P synergistically produce high-speed rotation of the ring gear R, and the resulting over drive rotation of the ring gear R is transmitted to the output axle 23.

The rotation of the output axle 23 is transferred via the counter drive gear 26 to the driven gear 45 and further to the differential gear unit 9 via the differential drive pinion 46. The differential gear unit 9 produces a so-called differential rotation of the laterally arranged front axles $41l$, $41r$.

The rotation of the engine output axle $1a$ is transmitted via the converter case 15 to the hydraulic pump 19 to thereby generate a predetermined oil pressure. The coil 30 is not live in the above-described engine cruising mode, so that, in the electric motor 6, the rotor 29 integrated with the output axle 23 idles. Of course, the electromotive force generated by such rotation of the rotor 29 may be utilized to charge a battery by connecting the electric circuit of the coil 30 with the battery.

On the other hand, when the vehicle repeats starts and stops in an urban area, at a low speed, the transmission 2 should be set in an electric motor cruising mode by means of a switch such as a mode selector switch. In this mode, the clutch C1 of the input clutch device 5 is released to cut off power transmission from the input axle 16 to the intermediate transmission axle 22 and then the coil 30 becomes live to operate the electric motor 6. The rotation of the rotor 29 in the electric motor 6 is transmitted to the output axle 23 and further to the laterally arranged front axles $41l$, $41r$ via the counter drive gear 26, the driven gear 45, the pinion 46 and the differential gear unit 9, in this order.

In this mode, the engine 1 can maintain a constant running at a low speed with little exhaust gas and noise, and the rotation of the output axle $1a$ is transmitted via the converter case 15 to the hydraulic pump 19 so as to generate the predetermined oil pressure. Incidentally, the rotation of the engine output axle $1a$ does not affect the intermediate transmission axle 22 because the clutch C1 is released.

The hydraulic control system for the hybrid vehicle according to the present invention will now be explained with reference to FIG. 2 which is a block diagram showing general electrical control in this invention. An electrical control unit (ECU) 51 receives several signals including selected mode from the mode selector, vehicle speed, throttle opening extent, battery level and so on, and includes a drive mode decision device 52, a high/low speed decision device 53 and a lockup clutch decision device 55. The drive mode decision device 52 can send either an engine cruising mode signal $52a$ or an electric motor cruising mode signal $52b$ manually or automatically in accordance with the actual vehicle speed. Accordingly, in the engine cruising mode, the drive mode decision device 52 sends an ON signal to a solenoid valve (normally in an opened state) controlling a clutch control valve and also sends a certain duty signal to a duty solenoid valve 57 controlling a primary regulator valve. In the electric motor cruising mode, the drive mode decision device 52 sends a certain drive start signal to the electric motor 6 and also sends to the duty solenoid valve 57 a signal to precisely control the primary regulator valve. The high/low speed decision device 53 is operative in the engine cruising mode to send a signal to a solenoid valve 59 controlling a shift valve in accordance with the vehicle speed and the throttle opening extent. The lockup clutch decision device 55 is also operative in the engine cruising mode to send a signal to a solenoid valve 60 controlling a lockup clutch control valve, based on the vehicle speed and the throttle opening extent.

FIG. 3 is a diagrammatic view showing a fragmentary portion of a hydraulic circuit 611 in the first embodiment according to the present invention. The circuit 611 includes a clutch control valve 62, a primary regulator valve 63 and a lockup clutch control valve 65 which are regulated, respectively, by the solenoid valves 56, 57, 60. The primary regulator valve 63 has a line pressure port k which connects with a line pressure hydraulic path A communicating with the hydraulic pump 19, a converter pressure port r which connects with a converter pressure (secondary pressure) hydraulic path B, and a drain port x, to thereby control a line pressure in the hydraulic path A and generate a preferred converter (secondary) pressure in the hydraulic path B by regulating the ports k, r, x, responsive to control pressure from the duty solenoid valve 57. The clutch control valve 62 has a port a which connects with the line pressure hydraulic path A, a port b which connects with the hydraulic servo C-1 in the input clutch device 5, a port c which connects with the converter pressure hydraulic path B, a port d which connects with the torque converter 4 via the lockup clutch control valve 65, and a drain port x. The clutch control valve 62 regulates these ports responsive to a control pressure from the solenoid valve 56. The lockup clutch control valve 65 has a port e which connects with a converter pressure hydraulic path E connecting with the clutch control valve 62, ports f, g each of which supplies a different flow of the oil pressure toward the torque converter 4, and a port h which connects with an oil cooler. These ports are controlled responsive to the control pressure from the solenoid valve 60. Reference numeral 64 designates a secondary regulator valve which regulates converter pressure in the hydraulic path B to provide a lubricating oil pressure in a lubricating oil path L. The lubricating oil path L branches into lubricating oil branch path L1 connecting with the lubricating oil way 47 provided in the hybrid transmission 2 and an oil branch path D which connects with the ports 31, 31 for cooling the electric motor 6.

The hydraulic circuit 611 (first embodiment) in FIG. 3 has oil stored in an oil sump 67 of the case 3 which is drawn out by the hydraulic pump 19 directly driven by the engine 1 and is then regulated as the line pressure in the hydraulic path A by means of the primary regulator valve 63 which is under control of the solenoid valve 57. In the engine cruising mode, the solenoid valve 56 is live, and the ports a-b and the ports c-d are connected with each other in the clutch control valve 62. That is, the oil pressure in the hydraulic path A is fed to the hydraulic servo C-1 via the ports a and b to engage the clutch C1, and the converter pressure in the hydraulic path B is supplied to the hydraulic path E via the ports c and d. Referring to FIG. 5, the lockup control valve 65 is controlled by the solenoid valve 60, so that, upon acceleration of the vehicle, oil pressure at the port e1 is released through the port f to flow in direction i and the lockup clutch 13 of the torque converter 4 is disengaged. While, in the normal cruising mode, the port e2 communicates with the port g so that the oil pressure flows in a direction j whereby the lockup clutch 13 is engaged. The converter oil pressure fed from the port h is led to the oil cooler via an oil path G.

In the electric motor cruising mode, the solenoid valve 57 controls the primary regulator valve 63, the ports k and r are opened wide, the entirety of the oil from the pump 19 is fed to the hydraulic path B, and the respective connections between the ports a and b and between the ports c and d are broken in the clutch control valve 62. This releases tile input clutch device 5 because no oil pressure is fed to the hydraulic servo C-1. The oil supply to the torque converter 4 is also stopped due to lack of oil pressure in the converter pressure hydraulic path E. Accordingly, all oil from the pump 19 is led to the lubricating oil path L via the hydraulic path B and the secondary regulator valve 64. Most of the oil is then forwarded to the supply ports 31, 31 of the case 3 via the oil path D to effectively cool the coil 30.

As shown in FIG. 3 an orifice 66 may be provided between the hydraulic path B and the hydraulic path E. Therefore, the orifice 66 can feed a small amount of converter oil pressure to the torque converter 4, even in the electric motor cruising mode, without communication between the ports c and d in the clutch control valve 62. This bypass prevents air from entering into the torque converter 4 when changing from the electric motor cruising mode to the engine cruising mode and, therefore, driving force will not be suddenly lost due to air intake and harm from a jolt due to sudden recovery of the driving force will also be avoided.

The hydraulic pump 19 may be driven by the counter shaft 43 responsive to the vehicle speed or may be driven by an optional and dedicated D.C. motor 69 which is shown by dotted-line in FIG. 3 instead of being driven by the engine 1. FIGS. 7(A) and 7(B), which will be explained later, show another modification of this arrangement, wherein two hydraulic pumps are provided in parallel, one being driven by a dedicated D.C. motor 69 and the other being directly driven by the engine 1, so that respective oil pressures from both pumps are merged after passing through respective check valves and sent to the primary regulator valve 63.

It will be observed in FIG. 3 that an hydraulic path H, having therein a check valve 70, may be provided as indicated by a dashed line. When the oil pressure supply to the torque converter 4 is cut off in the electric motor cruising mode, ports c and m are brought into communication in the clutch control valve 62 to feed the converter pressure into the hydraulic path H. The oil is further transported to the oil cooler to be cooled via the ports e2-h and the oil path G. The oil to the motor 6 can be cooled in an optional oil cooler in the oil branch path D.

A second embodiment of the hydraulic circuit according to the present invention will be explained with reference to FIGS. 4 and 5. Incidentally, in the description of the following embodiment, the same reference numerals will be used to designate the same or similar components as those in the first embodiment, so that descriptions will be omitted or simplified.

The hydraulic circuit 612 of the second embodiment includes a dedicated motor cooling circuit 1 with a hydraulic pump 71 driven by a D.C. motor 69, an oil strainer 72 and an oil cooler 73. An oil path L3 is provided between the lubricating oil path L, through which oil is transported by the hydraulic pump 19 driven by the engine 1, and the oil path D to cool the coil 30. The oil path L3 has a check valve 75 to control the oil flow from the lubricating oil path L to the oil path D. The oil path D also has a check valve 76 to prevent oil flow ingress from the oil path L3. Incidentally, the aforementioned circuit I is shown as a dotted-line in FIG. 1. FIG. 5 is a diagrammatic view of the hydraulic circuit in the second embodiment, wherein 77 is a manual valve, 79 is a shift valve, 80 is a solenoid modulator valve, 81 is a pressure relief valve, 82 is a cooler bypass, 83 is a check valve, 85 is an accumulator for the input clutch device, and 86 is an accumulator for the brake.

The above circuit 612 facilitates an operative sequence as will be explained in more detailed below with reference to FIG. 5. Oil pressure from the hydraulic oil pump 19 is first regulated into the line pressure and led to the hydraulic path A by means of the primary regulator valve 63. The valve 63 can be controlled responsive to the control pressure in a hydraulic path J extending from the solenoid valve 57 into which the oil pressure in the hydraulic path A1 is fed via the solenoid modulator valve 80 and a strainer, so that, in the engine cruising mode, the line pressure is preferably controlled in accordance with the actual load the vehicle receives. The primary regulator valve 63 controls communication between the line pressure port k and the converter pressure port r over a predetermined range. The converted oil pressure from the port r is further controlled by the secondary regulator valve 64, which feeds lubricating oil path L via the ports n and o.

In the engine cruising mode, the solenoid valve 56 shifts the clutch control valve 62 to the right-half state as shown in the drawing, so that the oil pressure in the hydraulic path A2 downstream of the D-range port of the manual valve 77 flows into the hydraulic path k and to the accumulator 85 and the hydraulic servo C-1. Accordingly, the input clutch device 5 engages so as to securely transmit the drive power of the engine 1 to the front axles 41*l*, 41*r*. At this time, the shift valve 79 is also shifted by the solenoid valve 59. When the spool contained in the shift valve 79 is in the upward position shown in FIG. 5, port p, connected with the line pressure hydraulic path A, is closed and ports q and x communicate with each other, whereby the hydraulic oil in the hydraulic servo B-1 is drained to release the brake B1 and the change-gear unit 7 directly transmits the rotation of the intermediate transmission axle 22 to the output axle 23. When the spool of shift valve 79 is in its lowermost position, the oil pressure in the hydraulic path A is transported to a hydraulic path R via the ports p and q and is fed to the accumulator 86 and the hydraulic servo B-1 for engagement of the brake B1. In this condition, the change-gear unit 7 is in the over-drive state.

Furthermore, while the clutch control valve 62 is in right-half position, the converter pressure in the hydraulic path B is fed to the hydraulic path E via the ports c and d and further to the lockup clutch control valve 65. This valve 65 is controlled by the solenoid valve 60. When the valve 65 is in the left-half position as shown in FIG. 5 to speed up the vehicle, the oil pressure in the hydraulic path E is fed to the hydraulic path F leading to the torque converter 4 in the direction of arrow i via ports e1 and f. At the same time, the lockup clutch 13 is disengaged. In constant speed cruising, the lockup clutch control valve 65 shifts to the right-half position, so that the oil pressure in the hydraulic path E is transferred to the converter 4 via ports e2 and g in the direction of arrow j. The lockup clutch is then engaged and unnecessary oil is drained from the port f. Some of the oil fed into the hydraulic path F is fed to an oil path G leading to the oil cooler via a check valve 83.

In the engine cruising mode, the D.C. motor 69 is not used, but the oil pressure from the hydraulic pump 19 driven by the engine 1 is fed to the secondary regulator valve 64 and is then directed for use as lubricating oil via the path L which branches to the paths L1 and D.

In the electric motor cruising mode, both the electric motor 6 and the motor 69, which drives the pump 71, are used. Also, the solenoid valve 56 changes the clutch control valve 62 from the right-half position to the left-half position. The duty solenoid valve 57 also controls the primary regulator valve 63 so that the ports k and r communicate with each other. Furthermore, the ports n and o communicate with each other in the secondary regulator valve 64. Accordingly, most of the hydraulic oil from the pump 19 is led to the hydraulic path B. At this time, the clutch control valve 62 in the left-half position shuts off the ports c, d and a and the oil fed from the port b is drained, whereby the oil pressure in the hydraulic path B does not flow into the hydraulic path E and does not reach the torque converter 4. The hydraulic oil in the hydraulic servo C-1 for the input clutch device 5 is drained to disengage the clutch C1. This means that the rotation of the output axle 1a idles, except for continuous rotation of the pump 19, and the vehicle runs with aid of the electric motor 6.

Since no oil is transferred to the torque converter 4, the oil in the hydraulic path B is almost all detoured to the lubricating oil path L via the secondary regulator valve 64 so as to be fed into plural lubricating oil branch path L1 via the check valve 75 and is supplied to the electric motor 6 via the oil branch path D and the ports 31. The oil pumped by the hydraulic pump 71, driven by the dedicated motor 69, is also fed to the lubricating oil branch path L1 and the oil branch path D via the check valve 76. As a consequence, the electric motor 6 is cooled with plenty of oil and is able to maintain a high efficiency of operation even with a repetition of stops and starts or uphill travelling. Incidentally, the check valve 76 is useful to prevent escape of the oil from the lubricating oil path L into the oil sump 67 via the idle pump 71.

The engine 1 may be stopped without exhausting car fumes even in the motor cruising mode. In this condition, the oil delivered by the hydraulic pump 71, driven by the dedicated motor 69, can be forwarded to several portions of the transmission 2, where the lubricating oil is constantly needed, via the oil cooler 73 and is also sent to the electric motor 6 via the oil branch path D. Incidentally, the oil from the hydraulic pump 71 does not flow behind the check valve 75, so that all oil from the pump 71 can be transferred to the lubricating oil branch path L1 and the oil branch path D.

Other hydraulic circuit arrangements according to the present invention will be explained hereunder with reference to FIGS. 6 and 7.

FIG. 6 is a diagrammatic view showing a modification of the transmission 22 for the hybrid vehicle, wherein there are provided, as in the transmission 2, the torque converter 4 equipped with the lockup clutch 13, the clutch C1, the electric motor 6, the single planetary gear set 32 (S, CR, R), an assembly defined by the brake B1 and the one-way clutch F, and a direct clutch C2 mechanically parallel to the one-way clutch F.

This modified transmission 22 works almost the same as the already explained transmission 2, except for having an engine brake in the engine cruising mode. More specifically, in the engine cruising mode, the rotation of the output axle 1a of the engine is transmitted to the intermediate transmission axle 22 via the torque converter 4 and the clutch C1. In direct power transmission from this axle 22 to the hollow output axle 23, a combination of the carrier CR, the sun gear S and the ring gear R is integrated by means of the one-way clutch F or the direct clutch C2. In this modification, the carrier CR and the sun gear S can be unified by this direct clutch C2 so as to provide the engine brake.

A third embodiment of the hydraulic circuit 613 according to the present invention is shown in FIGS. 7(A) and 7(B), which can be applied to the above modified transmission 22. This circuit 613 comprises the hydraulic pump 19 driven by the engine 1 and the hydraulic pump 71 driven by the dedicated D.C. motor 69 in parallel. Both hydraulic paths P1 and P2 extending from these pumps 19 and 71 are connected to the hydraulic path A via check valves 185 and 186. It will be noted in the drawing that no secondary regulator valve is provided in this circuit and only the pressure (primary) regulator valve 63, which is controlled by the duty solenoid valve 57, is used. In this embodiment, the shift valve 79 is adapted to control the hydraulic servo B-1 for the brake B1 and a hydraulic servo C-2 for the direct clutch C2.

The clutch control valve 62 has a port a which connects with the line pressure hydraulic path A, a port b which connects with the hydraulic servo C-1 in the input clutch device 5, ports c1, c2 which connect with the converter pressure hydraulic path B, ports d1, d2 which connect with the torque converter 4 via the lockup clutch control valve 65, and a port y for cooling the motor 6 and a bypass port z to thereby operate the hydraulic servo C-1 and the torque converter 4 and to feed oil to the oil branch path D for the electric motor 6. The lockup clutch control valve 65 is under control of the solenoid valve 60. The hydraulic path N connects the converter pressure hydraulic path E, downstream of the clutch control valve 62, and the line pressure hydraulic path A via an orifice 66. The oil branch D has an oil cooler 87.

Incidentally, 77 is the manual valve, 80 is the solenoid modulator valve, 81 is the pressure relief valve, 82 is the cooler bypass, 85 is the accumulator for the input clutch device, 86 is the accumulator for the brake, 89 is an accumulator for the direct clutch C2 and 90 is a torque converter bypass.

As has been explained, the oil delivered by the pump 19 driven by the engine 1 and the pump 71 driven by the dedicated motor 69 is first fed to the hydraulic path A via the check valves 185 and 186. The pressure in the path A is controlled by the pressure regulator valve 63 which is operated by the duty solenoid valve 57. In the engine cruising mode, the necessary pressure oil may be generated by means of the pump 19, driven by the engine 1, alone, without the dedicated motor 69. Otherwise, in the electric motor cruising mode, the necessary oil pressure may be generated by the pump 71 driven by the motor 69 without the pump 19. Incidentally, the oil once delivered by the pump 19 or 71 does not reverse flow through the check valves 185 and 186. It is of course possible to omit the pump 19 driven by the engine and to use only the pump 71 driven by the dedicated motor 69 both in the engine and electric motor cruising modes. This motor 69 is advantageous to provide pressure and quantity of the hydraulic oil strictly in accordance with conditions.

In the engine cruising mode, the pressure regulator valve 63 regulates the oil received at the port k as flows out from the drain port x and the port r. The oil pressure regulated by the valve 63 is fed to the lubricating oil way 47 in the transmission via orifices and the lubricating oil branch path L1 and to the manual valve 77. The oil pressure in the hydraulic path A can be transferred to the clutch control valve 62 via the hydraulic path A3 and to the shift valve 79 via the hydraulic path A4 when the manual valve 77 is shifted to one of "D", "2" and "L" positions The converted oil pressure from the port r of the pressure regulator valve 63 is also fed to the clutch control valve 62.

In the engine cruising mode, the solenoid valve 56 is operated to shift the clutch control valve 62 to the upper-half position shown in FIGS. 7(A) and 7(B), so that the ports a and b communicate with each other and the oil pressure in the hydraulic path A3 can be fed to the accumulator 85 and the hydraulic servo C-1. The oil in the hydraulic path B is led to the hydraulic path E via the ports c1-d1 and c2-d2. A hydraulic path R branches from the hydraulic path K extending to the hydraulic servo C-1. This path R extends to the pressure regulator valve 63 and is connected with the port w to reciprocally move the spool in order to control the line pressure in the hydraulic path A and the converter pressure in the hydraulic path B.

The oil pressure in the hydraulic path E is fed to the lockup clutch control valve 65. When this valve 65 is switched to the lower-half position as shown in the drawing, by means of the solenoid valve 60, the oil pressure in hydraulic path E is fed into the hydraulic path F in the direction of arrow i via the ports e1 and f in the lockup clutch control valve 65. The oil in the hydraulic path F is fed to the converter 4 to disengage the lockup clutch 13 and is further transferred, via the ports s-g and the hydraulic path Q, to the oil cooler 87 and the motor 6 through the ports 31, 31. With the lockup clutch control valve 65 in the upper-half position, the oil pressure in the hydraulic path E is fed to the hydraulic path F via the ports e2-g in the direction of arrow j direction to thereby engage the lockup clutch 13 in the torque converter 4. The used oil is lastly drained via the port f. Incidentally, some amount of the oil can be sent to the oil cooler 87 and the motor via the orifice 92.

When the vehicle is in acceleration or braking in the engine cruising mode, the shift valve 79 is switched to its upper-half position by means of the solenoid valve 59 as shown in FIGS. 7(A) and 7(B). Accordingly, the oil pressure in hydraulic path A4 can reach the accumulator 89 and the hydraulic servo C-2 to engage the direct clutch C2 whereby the change-gear unit 7 is kept in the direct drive state.

Meanwhile, the shift valve 79 changes to its lower-half position in constant speed cruising and the oil pressure in the hydraulic path A4 is fed to the accumulator 86 and the hydraulic servo B-1 via the ports p and q whereby the brake B1 engages to keep the change-gear unit 7 in the overdrive state.

In the motor cruising mode, the ports k and r of the pressure regulator valve 63 communicate with each other, by operation of the duty solenoid valve 57, so that the oil delivered by the hydraulic pumps 19 and 71 can be fed into the hydraulic path B.

With the clutch control valve 62 in its lower-half position, the oil in the hydraulic path B is then fed to the hydraulic path D via the ports c2-y. The oil further travels to the motor 6, via the oil cooler 87, wherein the oil cools the coil 30. The oil pressure in the hydraulic path B is also fed to the torque converter bypass 90 via the ports c1-z and thereafter flows together in the hydraulic path E. This path E is connected to the hydraulic path A via the hydraulic path N and the orifice 66 in order to gradually supply, via the ports e1 and f of the lockup clutch control valve 65, the oil to the torque converter 4 to keep the converter 4 filled with oil. The oil exiting the converter 4 advances to the motor 6 after being cooled in the oil cooler 87.

As has been explained above, the oil pressure in the hydraulic path B is almost entirely fed to the hydraulic path D by means of the clutch control valve 62 to effectively cool the motor 6 with plenty of oil, but some oil is always forwarded to the torque converter 4 via the orifice 66. Hence, at the time when the cruising mode is changed from the electric motor cruising mode to the engine cruising mode, the driving force will not be lost suddenly due to ingress of air and harm such as vibration of the vehicle body because of a sudden recovery of the driving force will be avoided, as the converter 4 is continuously filled with oil.

FIGS. 8(A) and 8(B) show a fourth embodiment of the hydraulic circuit 614 which partially includes the third embodiment of the present invention. It will be noted that only components differing from the third embodiment are surrounded by a dotted-line.

This embodiment further includes an orifice valve 95 having a supply port $\alpha$ connected with the line pressure hydraulic path A, a port $\beta$ connected with the hydraulic path E via a small diameter orifice 66, a port $\delta$ connected with the hydraulic path E via a large diameter orifice 97, and a control port $\epsilon$ connected with the hydraulic path D through the hydraulic path T.

In this hydraulic circuit 614, the clutch control valve 62 remains in the lower-half position while in the motor cruising mode whereby the oil pressure in the hydraulic path B can be forwarded to the hydraulic path D and thereafter transferred to the motor 6 to cool the coil 30. Some oil in the hydraulic path D is fed into the control port e of the orifice valve 95 via a hydraulic path T to shift the valve 95 to the upper-half position as shown in FIGS. 8(A) and 8(B). In this condition, the oil pressure in the hydraulic path A is fed to the hydraulic path E via the supply port α, the port β and the small diameter orifice 66 which is set to let a minimum oil flow into the torque converter 4 to maintain it constantly filled.

In the engine cruising mode, the clutch control valve 62 is shifted to the upper-half position and no oil enters into the hydraulic path D. The orifice valve 95 also receives no oil from the control port ε and is in its lower-half position. The oil pressure in the hydraulic path A is fed to the hydraulic path E via the supply port α, the port δ and the large diameter orifice 97 which is set to accelerate oil supply to the torque converter 4.

Accordingly, a minimum amount of oil is fed to the torque converter 4 in the motor cruising mode without a waste of oil, but the remaining oil is a plentiful supply to the motor 6. In the engine cruising mode, enough oil can be directly transferred from the hydraulic path A to the torque converter 4 in which a desirable cooling is carried out.

It will be mentioned, however, that another hydraulic power transmission such as a fluid coupling, may be employed instead of the torque converter in the above explained embodiments.

The preferred modifications of the oil paths for lubricating mechanical parts such as a single planetary gear 32, the one-way clutch F or the brake B1 accommodated in the transmission case 3, and for cooling the coil 30 in the electric motor 6 will be explained in detail with reference to attached FIGS. 9-12.

FIG. 9 shows a standard assembly of oil paths D, L1 with orifices for the electric motor 6 and the mechanical parts in the transmission case 3, which structure has already been outlined for each embodiment of the hydraulic system according to the present invention.

The oil exiting the primary regulator valve 63 is fed to the secondary regulator valve 64 through the converter pressure hydraulic path B. The oil in the 20 hydraulic path B is further controlled by the secondary regulator valve 64 for use in the torque converter 4 and the like. The secondary regulator valve 64 feeds some oil at a certain pressure to the oil paths L1, D via orifices 100, 101.

The oil paths L1 extend to and lubricate the needle bearings oriented between the sun gear S and the intermediate transmission axle 22, the area where the pinion P meshes with the sun gear S and/or the ring gear R, the sliding contact between the pinion P and the carrier CR, the areas between the outer race and the inner race of one-way clutches and the plural plates defining the brake B1. Each orifice 100 provided in the respective oil paths L1 reduces the pressure of oil supplied from the secondary regulator valve 64 to a predetermined level for lubricating the above-mentioned mechanical parts in the transmission 2. Hence, mechanical parts in the transmission 2 will be sufficiently lubricated by oil as regulated by the orifices 100.

The oil pressure from the secondary regulator valve 64 also branches off to the oil path D through an orifice 101. The oil path D extends to the electric motor 6 via the oil supply ports 31 to cool the coil 30. The orifice 101 allows a sufficient oil flow rate to supply enough oil to the coil 30.

FIG. 10 is the first modification of the oil paths for lubricating the mechanical parts in the transmission with the oil at a certain pressure and for cooling the coil 30 with a sufficient quantity of oil. The difference from that in the standard assembly of oil paths depicted in FIG. 9 is that a modulator valve 110 is provided downstream of the secondary regulator valve 64.

The modulator valve 110 is adapted to control the pressure of oil fed, via the oil paths L1, to the mechanical parts in the case 3 and also to regulate the flow rate of the oil, via the oil path D, to the coil 30. This first modification naturally achieves the same effects as have already been explained in connection with the standard assembly of oil paths. Incidentally, respective fine adjustments of oil pressure for each of the mechanical parts lubricated can be provided by the orifices 100.

FIG. 11 shows a second modification of the oil paths for lubricating the mechanical parts in the transmission 2 with a oil at a certain pressure level and for cooling the coil 30 with a sufficient quantity of oil. The difference from that in the already-explained standard assembly of the oil paths depicted in FIG. 9 is that only the oil path D for the coil 30 is connected with the port o of the secondary regulator valve 64 and that the oil paths L1 respectively provided for mechanical parts in the case 3 are connected with the converter pressure hydraulic path B via orifices 100.

In this modification, as the oil paths L1 may receive rather higher oil pressure than in other modifications due to direct connection with the hydraulic path B, and have oil pressure preferably controlled by means of the orifices 100.

FIG. 12 shows a third modification of the oil paths for lubricating the mechanical parts in the transmission 2 with oil at a certain pressure and for cooling the coil 30 with a sufficient quantity of oil. The difference from that in the first modification is that a relief valve 120 is employed in place of the modulator valve 110, by which effects are the same as in the first modification.

What is claimed is:

1. A hydraulic system for a hybrid vehicle, combining an internal-combustion engine and an electric motor together for selective use, wherein power of the internal-combustion engine and that of the electric motor are transmitted to a differential gear unit with drive axles through a hydraulic power transmission and an input clutch device, said hydraulic system comprising:

a hydraulic oil pump for supplying hydraulic oil to a line pressure hydraulic path;

a primary regulator valve having at least a line pressure port and a converter pressure port, said line pressure port connecting with said hydraulic pump and with the line pressure hydraulic path and said converter pressure port connecting with a secondary pressure hydraulic path, the extent of opening of said ports being variably controlled;

a control valve having at least a first port which receives hydraulic oil pressure from the secondary pressure hydraulic path and a second port and means for switching said control valve between an engine cruising mode position wherein said first and second ports are in communication and an electric motor cruising mode position wherein there is no communication between said first and second ports;

motor cooling means, including a cooling oil path, for supplying said hydraulic oil to the electric motor;

lubricating means, including a lubricating oil path, for supplying said hydraulic oil to lubricate mechanical parts in the transmission; and an electrical control unit including a drive mode decision device for selecting one of an engine cruising mode in which the vehicle is moved by the engine and an electric motor cruising mode in which the vehicle is moved by the electric motor, said primary regulator valve, in the engine cruising mode, controlling the pressure in the line pressure hydraulic path and in the secondary pressure hydraulic path to said control valve and the hydraulic power transmission and, in the electric motor cruising mode, directing most of the hydraulic oil from said hydraulic oil pump to said motor cooling means with said control valve positioned to prevent communication between said first and second ports.

2. The hydraulic system according to claim 1, wherein said control valve further has a third port connecting with the line pressure hydraulic path and a fourth port connecting with a hydraulic servo for the input clutch device, whereby, in the engine cruising mode, the input clutch device is engaged by a serial opening of the third and the fourth ports and, while in the electric motor cruising mode, the input clutch device is disengaged.

3. The hydraulic system according to claim 1, wherein said control valve further has a fifth port which shut in said engine cruising mode position with the first and the second ports communicating to direct flow of the hydraulic oil to the hydraulic power transmission, and while in the electric motor cruising mode position the first and the fifth ports communicate to direct the hydraulic oil, with the second port shut, to forward the hydraulic oil to the motor cooling means.

4. The hydraulic system according to claim 1, further comprising an orifice between the converter pressure port and an hydraulic path extending to the hydraulic power transmission.

5. The hydraulic system according to claim 1, wherein both said lubricating oil path and said cooling oil path have orifices.

6. The hydraulic system according to claim 5 wherein said lubricating means includes a plurality of lubricating oil paths, each of which is provided with an orifice.

7. The hydraulic system according to claim 1, further comprising a secondary regulator valve for regulating the pressure of the hydraulic oil feed to said lubricating oil path and said cooling oil path.

8. The hydraulic system according to claim 7, wherein said secondary regulator valve is a modulator valve.

9. The hydraulic system according to claim 7, wherein said secondary regulator valve is a relief valve.

10. The hydraulic system according to claim 1, wherein said lubricating oil path is connected with the line pressure port of said primary regulator valve and wherein said cooling oil path is connected with the converter pressure port of said regulator valve.

* * * * *